US011420530B2

(12) United States Patent
Akhavan-Tafti

(10) Patent No.: US 11,420,530 B2
(45) Date of Patent: Aug. 23, 2022

(54) SYSTEM AND METHODS FOR A CHARGING NETWORK OF MOBILE POWER TRANSMITTERS

(71) Applicant: THE REGENTS OF THE UNIVERSITY OF MICHIGAN, Ann Arbor, MI (US)

(72) Inventor: Mojtaba Akhavan-Tafti, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 257 days.

(21) Appl. No.: 16/552,392

(22) Filed: Aug. 27, 2019

(65) Prior Publication Data

US 2019/0381910 A1    Dec. 19, 2019

Related U.S. Application Data

(63) Continuation-in-part of application No. 16/377,513, filed on Apr. 8, 2019, now abandoned.
(Continued)

(51) Int. Cl.
*B60L 53/68* (2019.01)
*H02J 7/02* (2016.01)
(Continued)

(52) U.S. Cl.
CPC ............. *B60L 53/68* (2019.02); *B60L 53/305* (2019.02); *B60L 53/35* (2019.02); *B60L 53/62* (2019.02);
(Continued)

(58) Field of Classification Search
CPC ........ B60L 53/68; B60L 53/62; B60L 53/305; B60L 53/35; B60L 53/65; B60L 53/12; B60L 53/14; H02J 7/342; H02J 7/025
See application file for complete search history.

(56) References Cited

U.S. PATENT DOCUMENTS 6,223,675 B1    5/2001  Watt et al.
8,146,527 B2    4/2012  Pellen
(Continued)

FOREIGN PATENT DOCUMENTS

KR    20160015716 A    2/2016
KR    20160043902 A    4/2016
(Continued)

OTHER PUBLICATIONS

International Search Report and Written Opinion dated Apr. 29, 2020 regarding PCT/US2019/026580.

*Primary Examiner* — Carlos Amaya
(74) *Attorney, Agent, or Firm* — Harness, Dickey & Pierce, P.L.C.

(57) ABSTRACT

A decentralized charging network of mobile power transmitters comprises a server, power receivers, and a fleet of deployable mobile power transmitters comprising a control system, a power source system having a charge measuring device for monitoring the charge transfer, a charging system configured to transfer charge from the power source system to the power receiver, and a communication system for communication between a power receiver, a server, and the control system. A charging request is received and processed by a server from a power receiver or an operator preparing to charge a power receiver. A qualified mobile power transmitter is identified and instructed to arrive at a location and to charge a power receiver according to charging instructions prepared by the server. The charging is monitored and, upon completion, the mobile power transmitter deactivates the charging session and informs the server.

20 Claims, 18 Drawing Sheets

Related U.S. Application Data

(60) Provisional application No. 62/654,707, filed on Apr. 9, 2018.

(51) Int. Cl.
  *B60L 53/30*  (2019.01)
  *B60L 53/62*  (2019.01)
  *B60L 53/65*  (2019.01)
  *B60L 53/35*  (2019.01)
  *H02J 7/34*  (2006.01)
  *B60L 53/14*  (2019.01)
  *B60L 53/12*  (2019.01)

(52) U.S. Cl.
  CPC .............. *B60L 53/65* (2019.02); *H02J 7/025* (2013.01); *H02J 7/342* (2020.01); *B60L 53/12* (2019.02); *B60L 53/14* (2019.02)

(56) References Cited

U.S. PATENT DOCUMENTS

| | | | |
|---|---|---|---|
| 9,592,742 B1* | 3/2017 | Sosinov | H02J 50/10 |
| 2013/0346166 A1* | 12/2013 | Chihara | B60L 53/305 |
| | | | 705/13 |
| 2015/0336669 A1 | 11/2015 | Kantor et al. | |
| 2016/0049799 A1 | 2/2016 | Takatsu et al. | |
| 2017/0174092 A1* | 6/2017 | Kohn | B60L 53/30 |

FOREIGN PATENT DOCUMENTS

| | | |
|---|---|---|
| KR | 20170024300 A | 3/2017 |
| WO | 2015196296 A1 | 12/2015 |

* cited by examiner

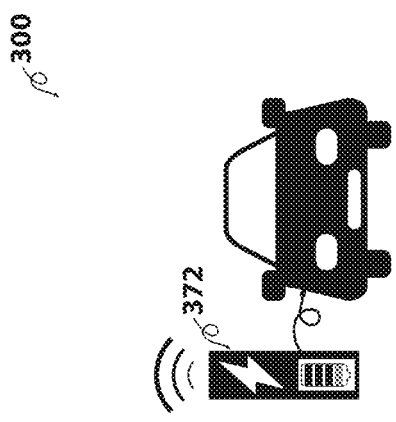
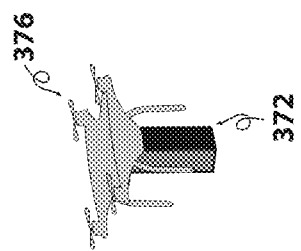
FIG. 17

SYSTEM AND METHODS FOR A CHARGING NETWORK OF MOBILE POWER TRANSMITTERS

CROSS-REFERENCE TO RELATED APPLICATIONS

This application is a continuation-in-part of U.S. patent application Ser. No. 16/377,513 filed on Apr. 8, 2019, which claims the benefit and priority of U.S. Provisional Application No. 62/654,707 filed on Apr. 9, 2018. The entire disclosure of the above-referenced application is incorporated herein by reference.

FIELD

The present disclosure relates to charging and, more particularly, relates to a systems and methods for charging a power receiver with a mobile power transmitter.

BACKGROUND AND SUMMARY

This section provides background information related to the present disclosure that is not necessarily prior art. This section provides a general summary of the disclosure, and is not a comprehensive disclosure of its full scope or all of its features.

With the recent popularity of electric consumers (EC), increasing effort is focused on addressing several challenges associated with battery-operated devices: 1) the low charge capacity of batteries requires frequent charging, 2) the low re-charging rate of conventional batteries, and 3) the associated scarcity and specificity of charging services.

Wire charging of EC, which requires physical contact between a power transmitter and a power receiver via a cable or other device, is currently widely accepted. Recent wireless charging capabilities that enable transferring of power via free space have also become increasingly popular.

With the size of electronic circuits shrinking, power delivery and storage are becoming more challenging. Laser-based power delivery has been proposed as a solution to create compact electronic circuits. For example, laser power beaming uses a laser to deliver concentrated light to a remote power receiver by a power transmitter. The receiver then converts the light to electricity, similar to solar powered photovoltaic (PV) cells converting sunlight into electricity.

The unprecedented dramatic market growth of Unmanned Aerial Vehicles (UAVs) is in part due to their maneuverability and small size. However, short battery life has severely restricted the range of electric powered UAVs and has proven difficult to address. Conventional systems have attempted to employ solar power, hybrid propulsion (on-board fuel-powered generators), and hydrogen fuel cells to extend UAVs' operation time; however these have not provided more than a few additional hours of operation.

Similarly, with the advancement of rechargeable batteries and hybrid engines, the number of manufactured electric vehicles continues to grow. According to the United States Department of Energy (DOE), the number of plug-in electric vehicles (PEVs) sold in the U.S. grew at rates up to 30,000 per year. China, the leading electric vehicle market in the world, has also seen significant increases in the number of manufactured and sold electric vehicles, according to China Association of Automobile Manufacturers (CAAM).

The technology improvements, cost reduction, increasing model choice, maturing charging infrastructure, and economic recovery over the past decade have positively influenced and supported the increased sales of PEVs. However, mass adoption of PEVs remains low, due in part to the small number of adequate charging stations—the number of public charging stations in the U.S. and Canada is seven times smaller than the number of gas stations.

To address customer anxiety regarding charging of PEVs, proprietary and third-party charging networks have been developed and deployed. However, these efforts to increase the number of charging stations may threaten the performance and the load capacity of the power distribution network, i.e., the power grid.

Recently, commonly-assigned PCT Application No. PCT/US2018/49880 disclosed the use of on-board electromagnetic power convertors for unlimited increase in operation time, which is incorporated herein by reference.

In accordance with the teachings of the present disclosure, a method for a power delivery system is provided wherein at least one charging service provider is a deployable mobile power transmitter (MPT) capable of delivering power to a power receiver (PR) in need of power. In some embodiments, the charging service provider is a mobile power transmitter while the power receiver can be stationary or mobile. This mobile power transmitter-to-power receiver power delivery can be done air-to-air, air-to-ground, ground-to-air, and ground-to-ground. The mobile power transmitter may operate in space, air, land, and sea. The operation may be done semi-automatically, i.e., in response to actuation by an operator, or fully automatically, i.e., involving no human intervention.

In some embodiments, the present mobile power transmitter may deliver power via a physical connector, e.g., electrical cable or fiber optic, or without any physical contact with the power receiver via non-contact mechanisms, e.g., inductive charging and electromagnetic power beaming. In some embodiments, the present method for power delivery will address the unmet need of uninterrupted and indefinite operation. In some embodiments, the present method will also provide the opportunity to receive charge at the location of the power receiver, thus, decentralizing charging services. The applications of the present teachings may include transportation and workspace robots.

Moreover, in accordance with to the principles of the present disclosure, systems and methods for power delivery are provided for charging power receivers (PRs), including PEVs, via a decentralized charging network of mobile power transmitters (MPTs). Thus, a PEV has the ability to charge from an off-board electric power source. PEVs are classified into two main categories: 1) all-electric vehicles (EVs) or battery-electric vehicles (BEVs), and 2) plug-in hybrid electric vehicles (PHEVs). In general, the term PEV is used to describe devices/vehicles powered in-part or completely by electricity stored in on-board rechargeable batteries or other storage devices.

In some embodiments, a decentralized charging network of MPTs comprises a server, PRs, and a fleet of deployable MPTs having onboard charge source systems and is capable of transferring charge to a PEV at a location. The MPT deployment is managed by the server and the process is initiated by a charging request from a PEV or an operator preparing to charge a PEV.

The main advantages of a decentralized charging network include: 1) abundant MPTs, 2) time-saving, 3) operating independent of a fixed infrastructure, 4) societal and economic power resilience and security, and 5) providing access to renewable sources of energy, especially for urban PEVs. Conventional fixed charging stations are commonly supported by a power grid with a significant carbon footprint.

However, in some embodiments, the present disclosure, as described and illustrated herein, provides access to deployable charging stations that can deliver charge to a location of a PEV. The MPTs can be charged with renewable sources of electricity such as wind and solar energy, therefore, lowering the economic and societal dependence on the centralized power distribution network.

There are several key differences between the present teachings and other existing technologies, such as, but not limited to: i) mobility, ii) connectivity, iii) continuous operation, iv) fast charging capability, v) decentralized power generation including renewable and clean sources of energy, vi) decentralized power delivery, vii) optional infrastructure, and viii) autonomy.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 4:
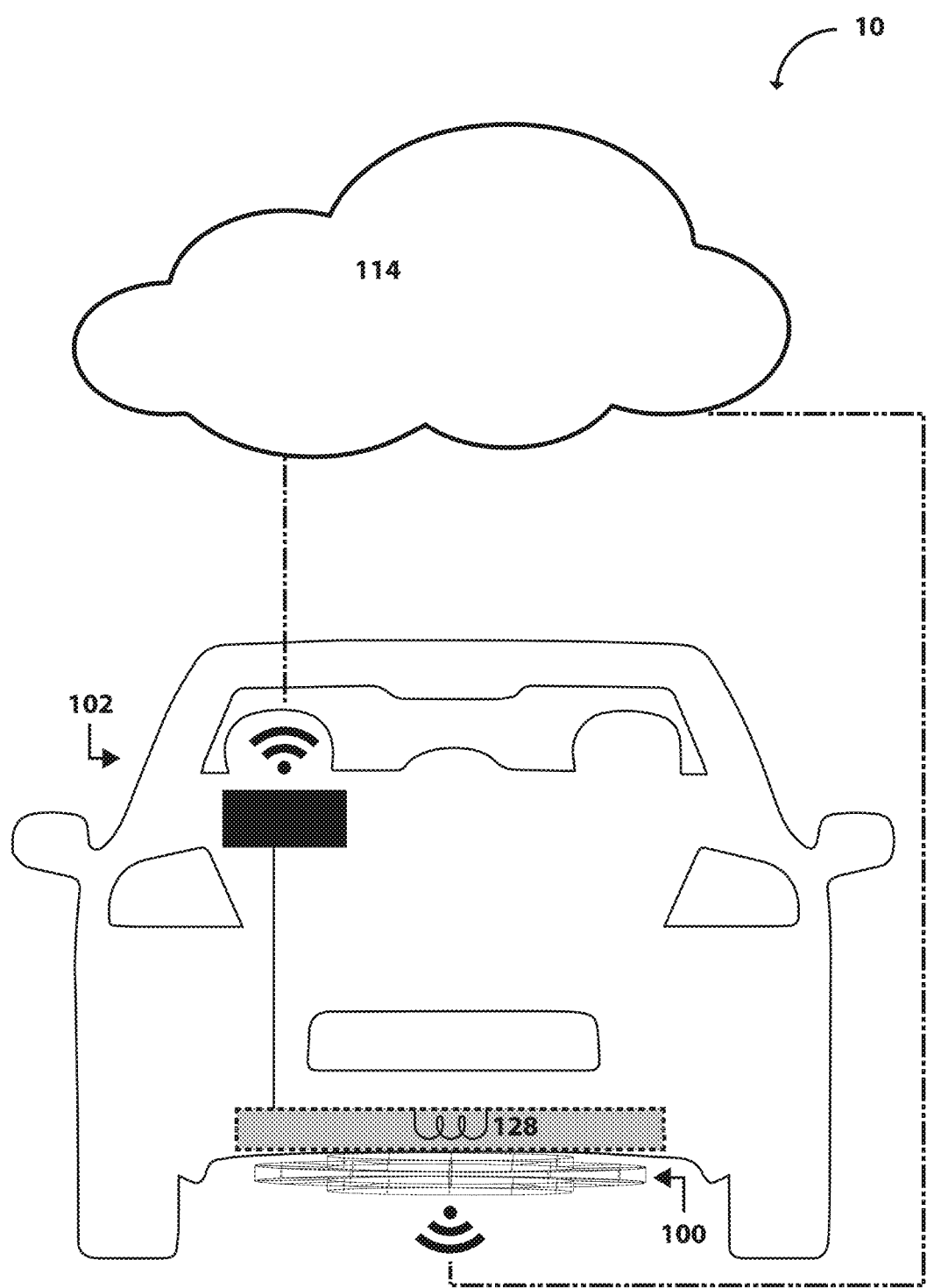

FIG. 4 illustrates a schematic view illustrating a configuration wherein a deployable MPT is capable of communicating (via the cloud or directly) with a PR's on-board control system. The MPT can attach, at least in part, to the PR while charging. This capability will allow continuous operation.

Figure 5:
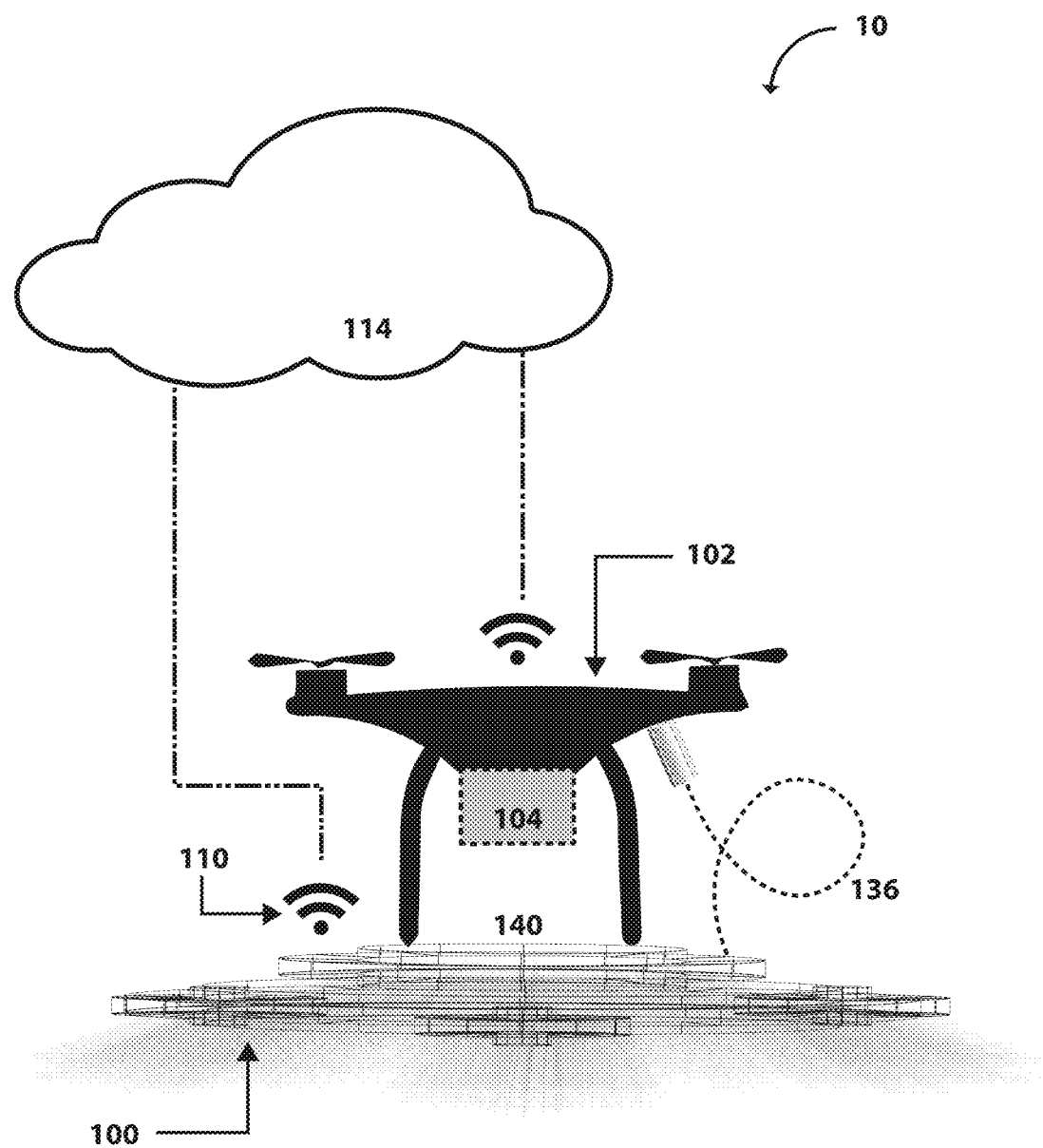

FIG. 5 illustrates a schematic view illustrating a configuration wherein a deployable MPT is capable of communicating (via the cloud or directly) with a PR's on-board control system. The MPT can land or attach to the PR while charging. The PR may carry an on-board electromagnetic storage and/or convertor unit. This capability will allow continuous operation.

Figure 6:
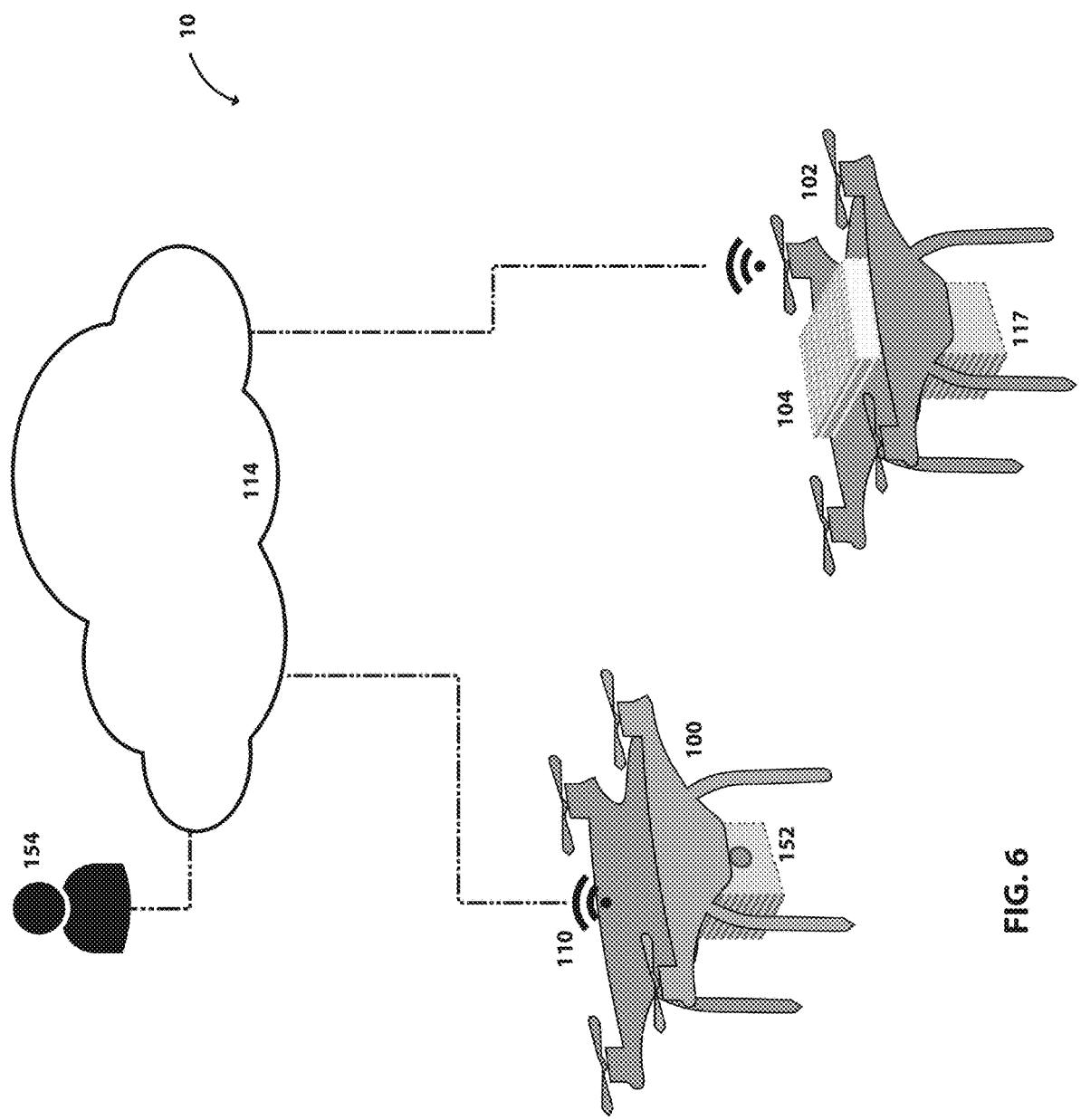

FIG. 6 illustrates a schematic view illustrating a configuration wherein a deployable MPT is capable of communicating (via the cloud or directly) with a PR's on-board control system. The MPT can track and charge the PR wirelessly while the PR continues operation. This operation can be done manually by an Operator-In-The-Loop, semi-automatically, or fully autonomously without any human intervention. The PR may carry one (or more) on-board electromagnetic storage and/or convertor units.

Figure 7:
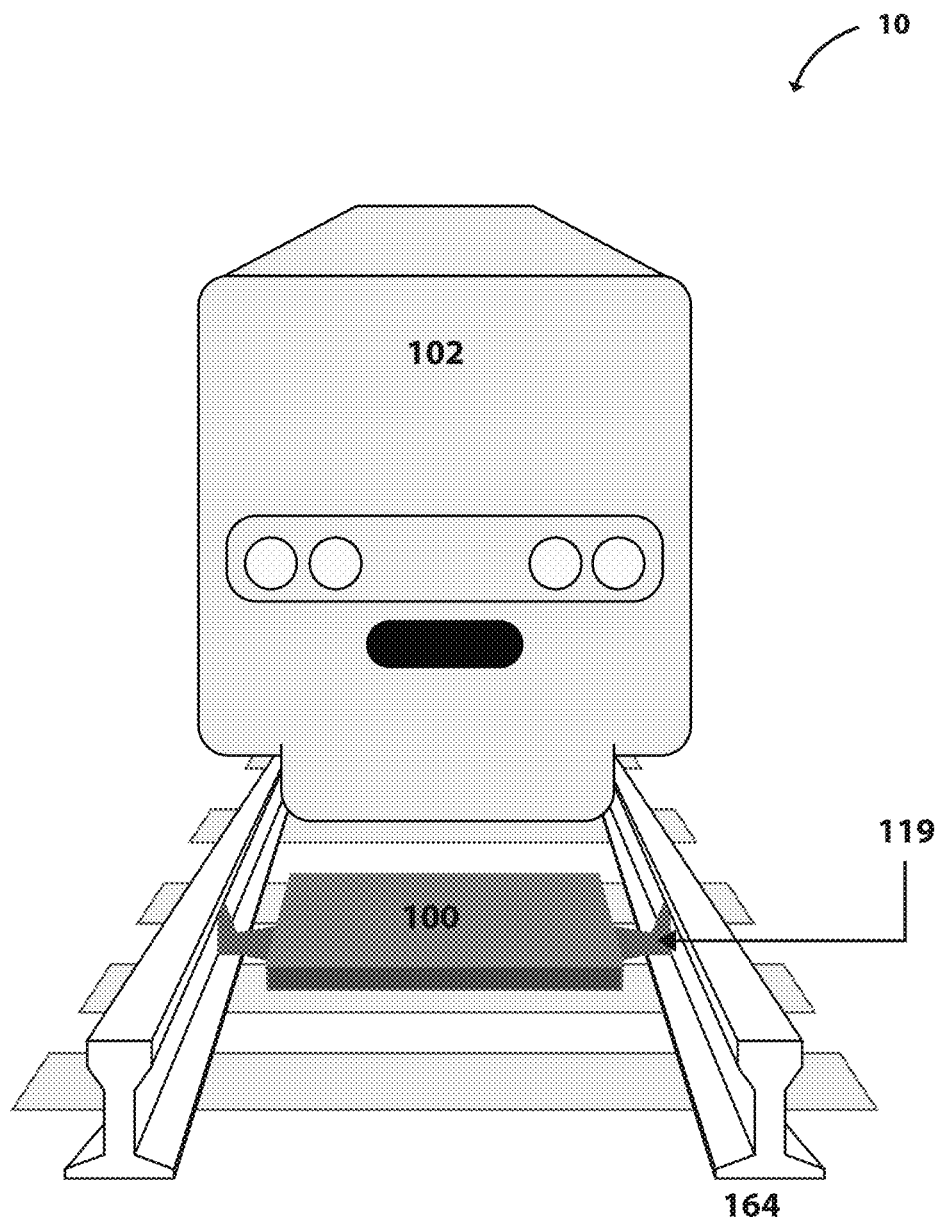

FIG. 7 illustrates a schematic view illustrating a configuration where a deployable MPT is deployed along a track member.

Figure 8:
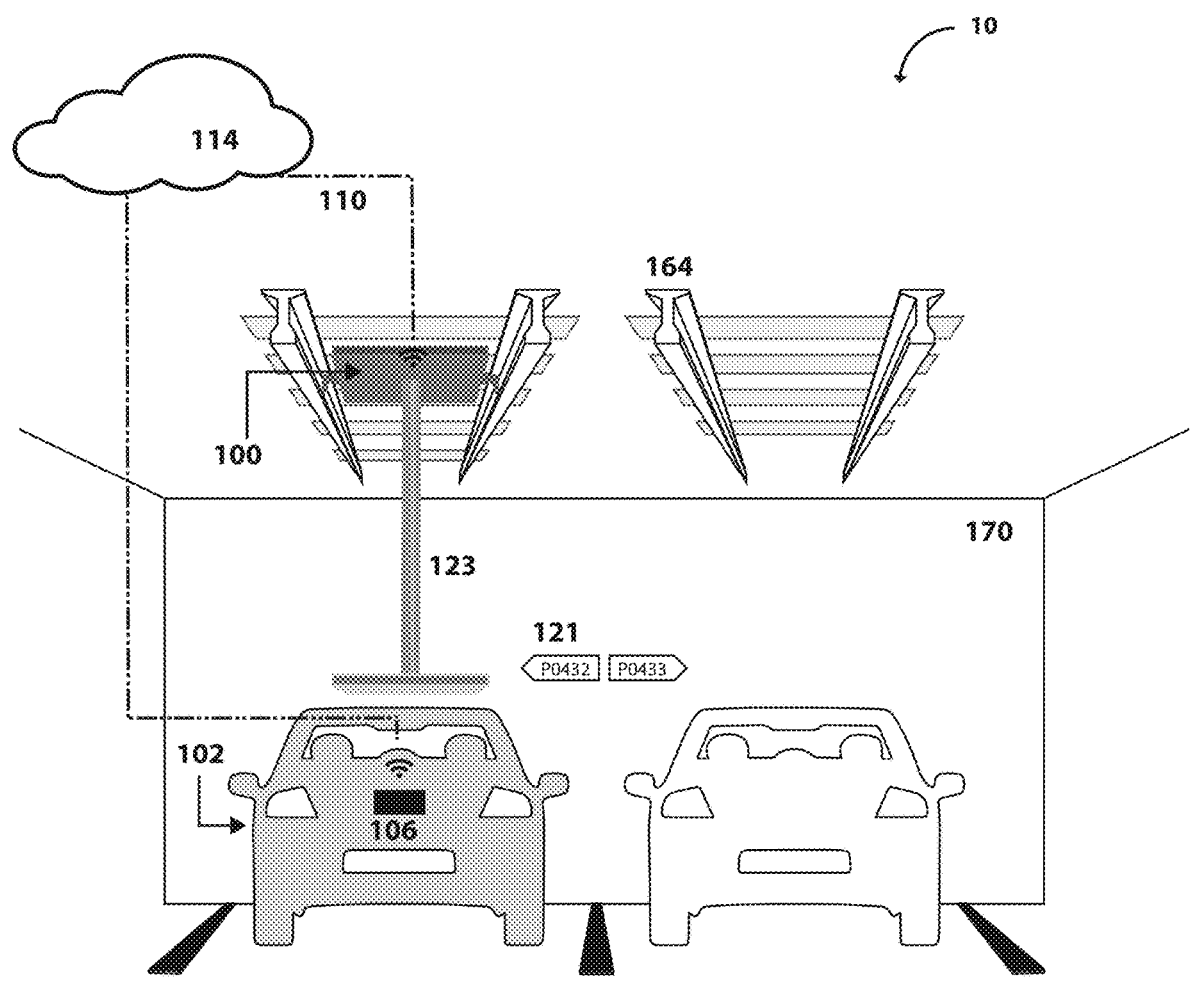

FIG. 8 illustrates a schematic view illustrating a configuration where a deployable MPT is deployed along an indoor track member.

Figure 9:
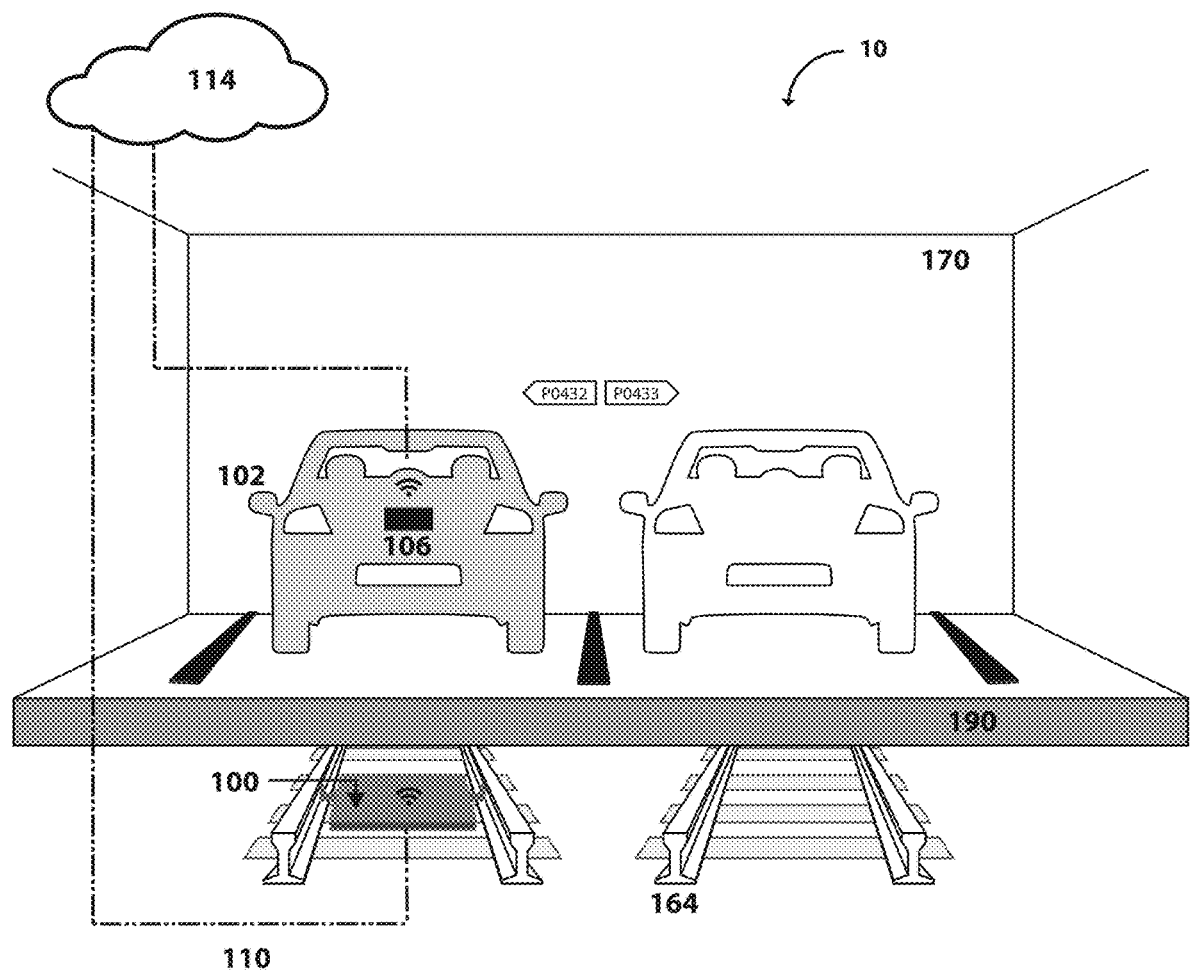

FIG. 9 illustrates a schematic view illustrating a configuration where a deployable MPT is deployed along an indoor track member below a floor surface.

Figure 10:
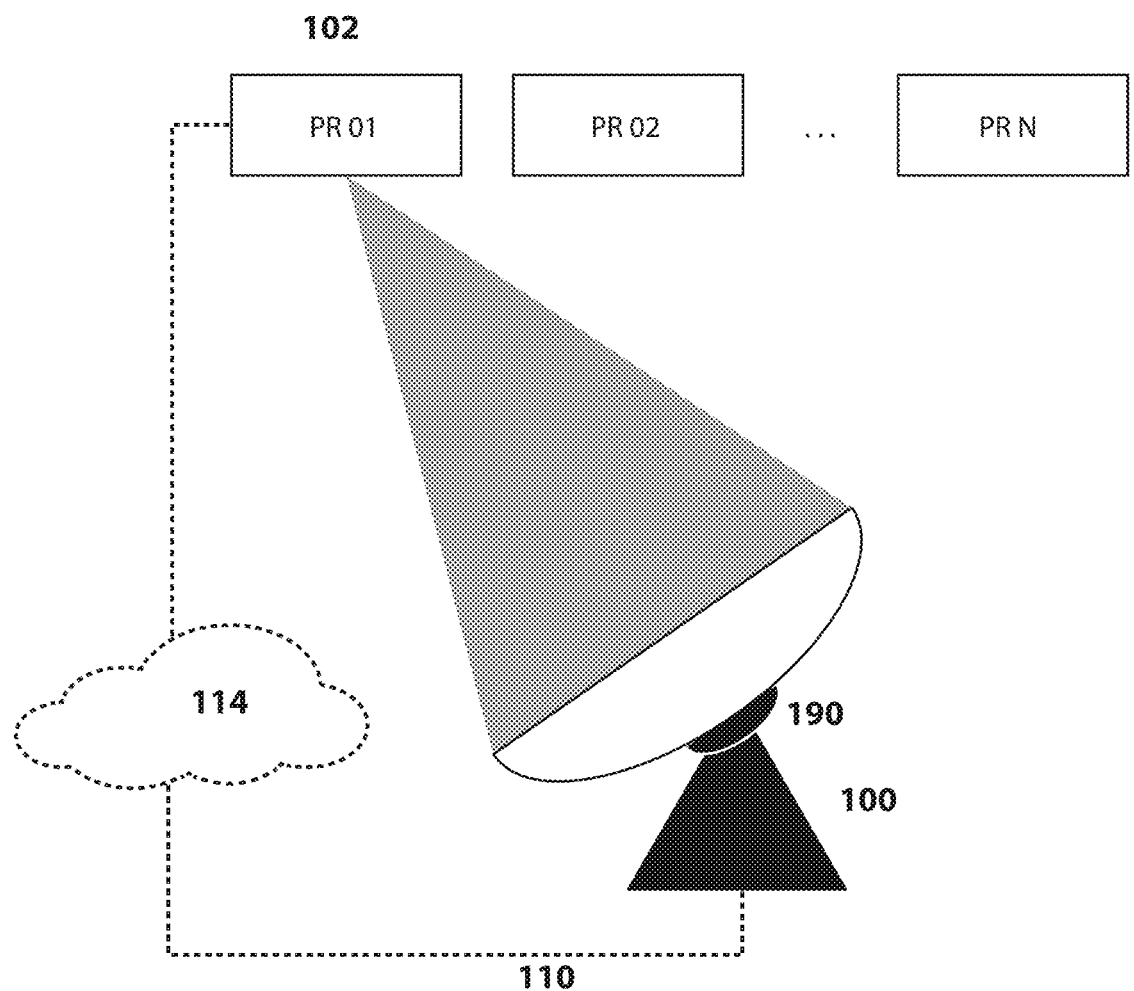

FIG. 10 illustrates a schematic view illustrating a configuration where a deployable MPT is pivotally or rotationally deployed.

Figure 11:
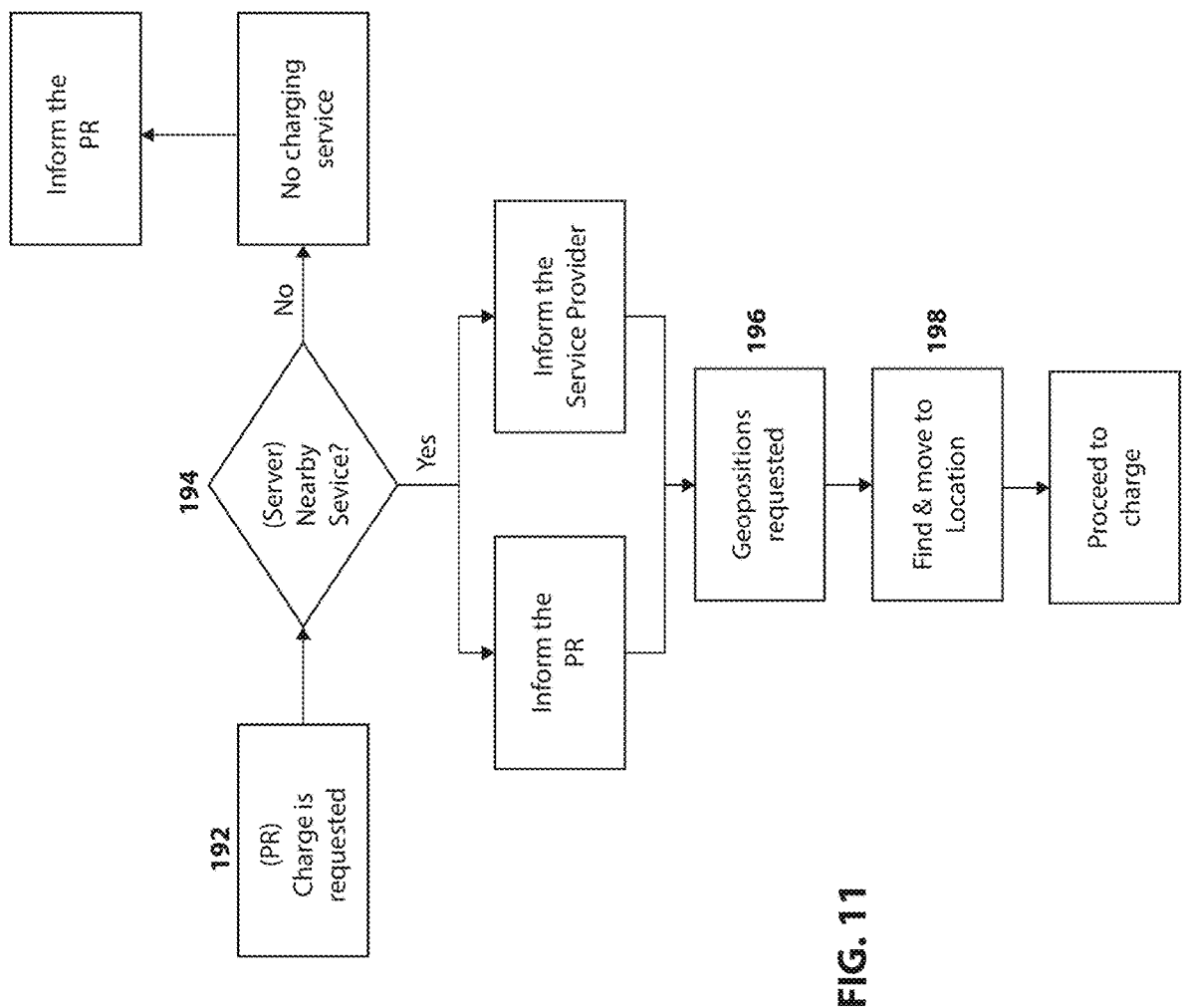

FIG. 11 illustrates a flow of an exemplary algorithm through which a PR requests (via mobile application, website, on-board communication system, etc.) and receives charging by an MPT according to some embodiments.

Figure 12:
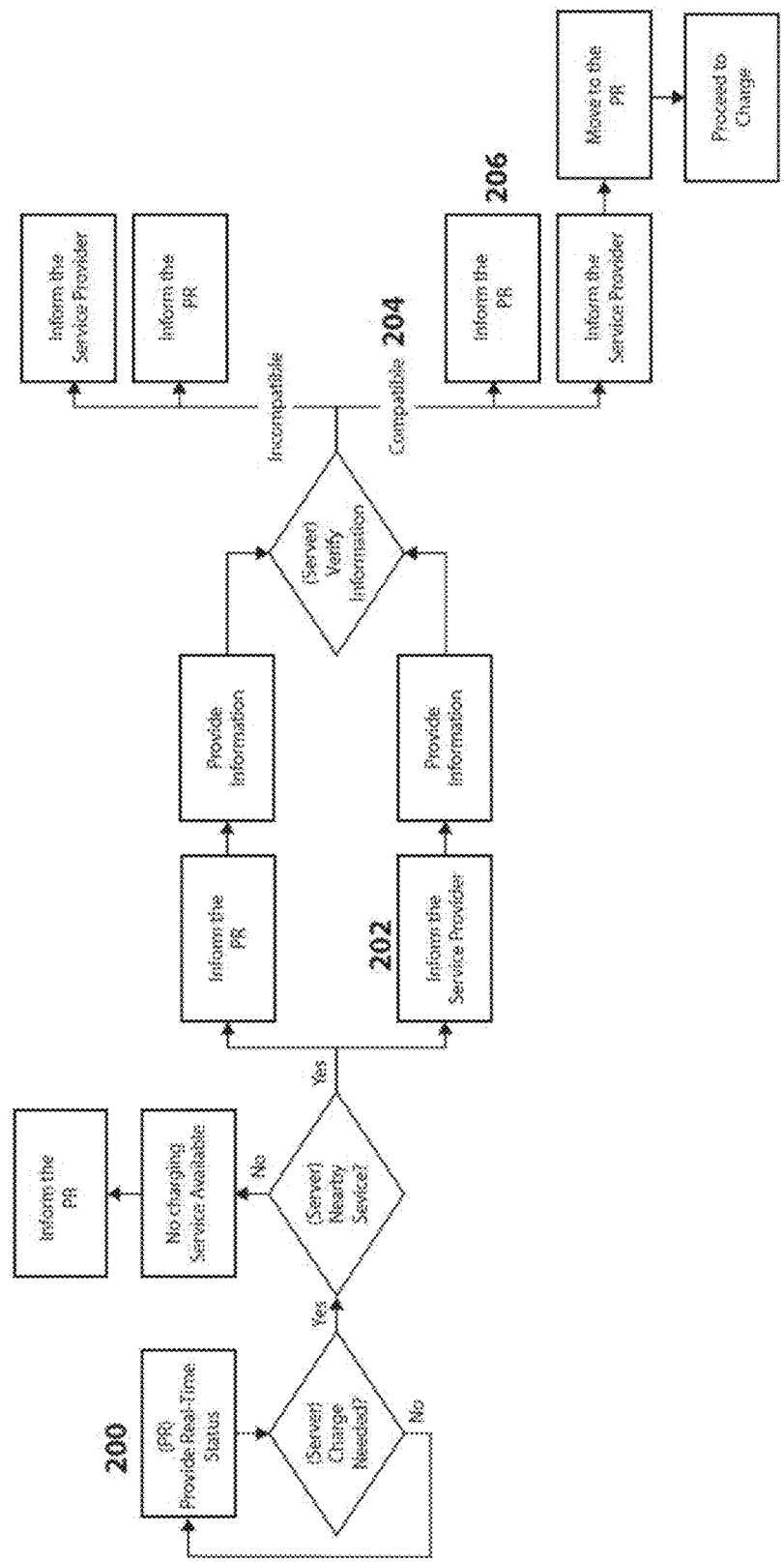

FIG. 12 illustrates a flow of an exemplary algorithm through which a PR requests (via mobile application, website, on-board communication system, etc.) and receives charging by an MPT according to some embodiments.

Figure 13:
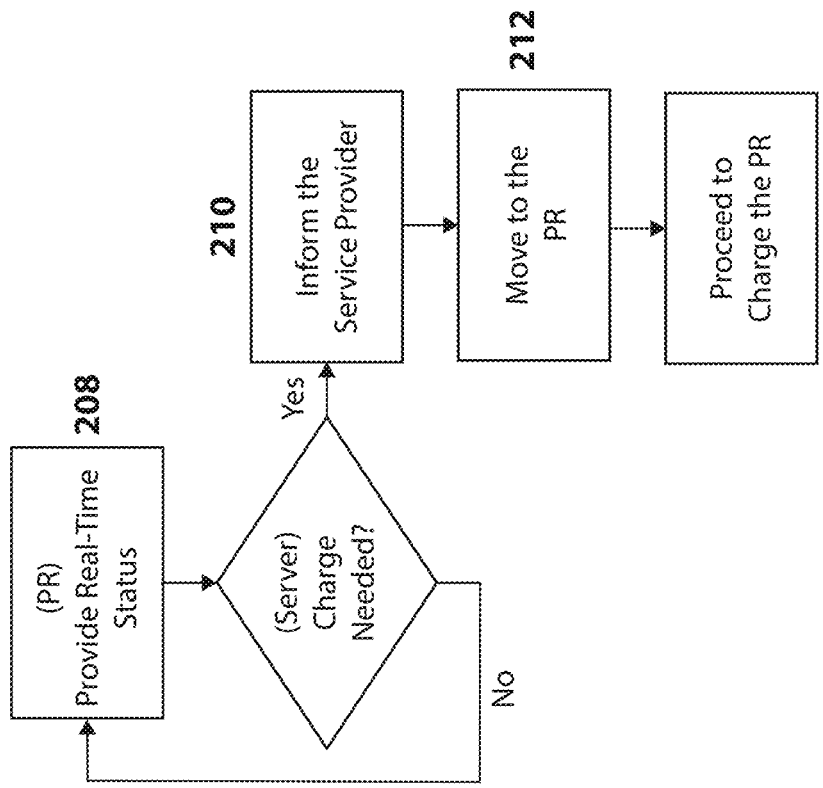

FIG. 13 illustrates a flow of an exemplary algorithm through which a PR requests (via mobile application, website, on-board communication system, etc.) and receives charging by an MPT according to some embodiments.

Figure 14:
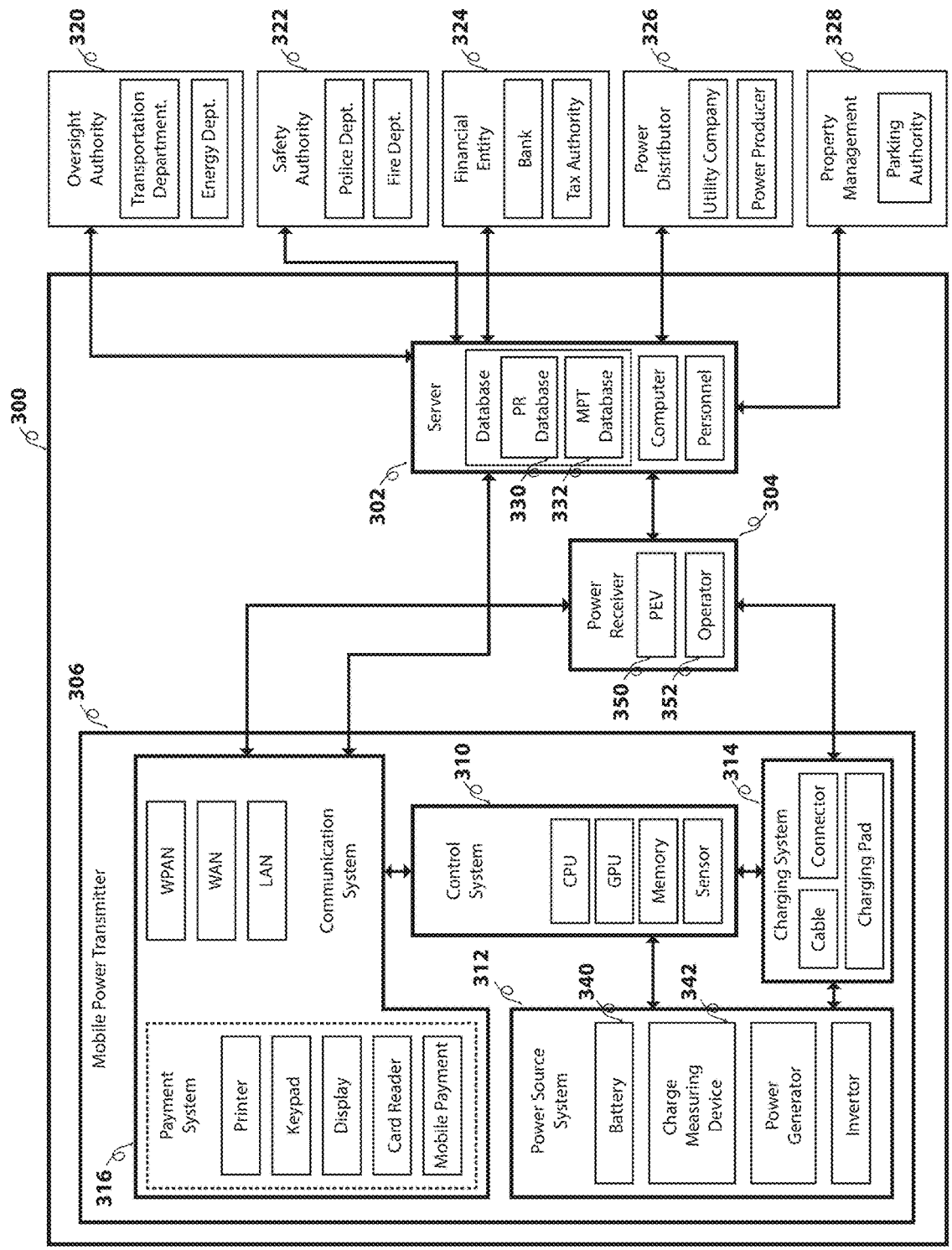

FIG. 14 illustrates a diagram of a charging network of mobile power transmitters wherein a mobile power transmitter is instructed by a server to deliver power to a power receiver.

Figure 15:
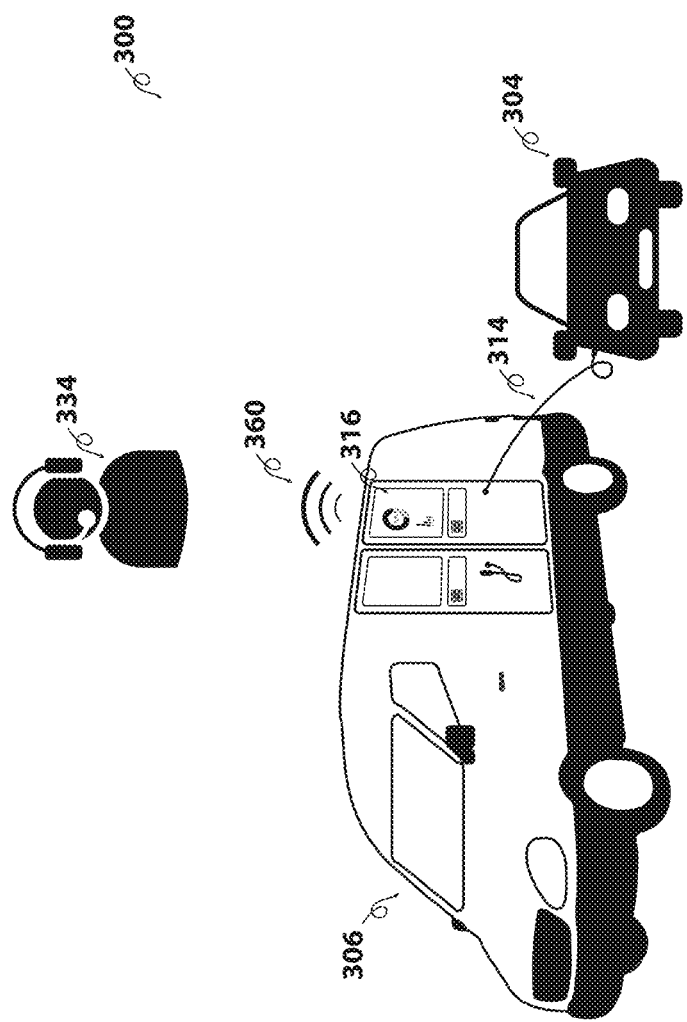

FIG. 15 illustrates a schematic illustration of a mobile power transmitter wherein charging stations aboard a vehicle deliver power to a power receiver, a plug-in electric vehicle, at a location.

Figure 16:
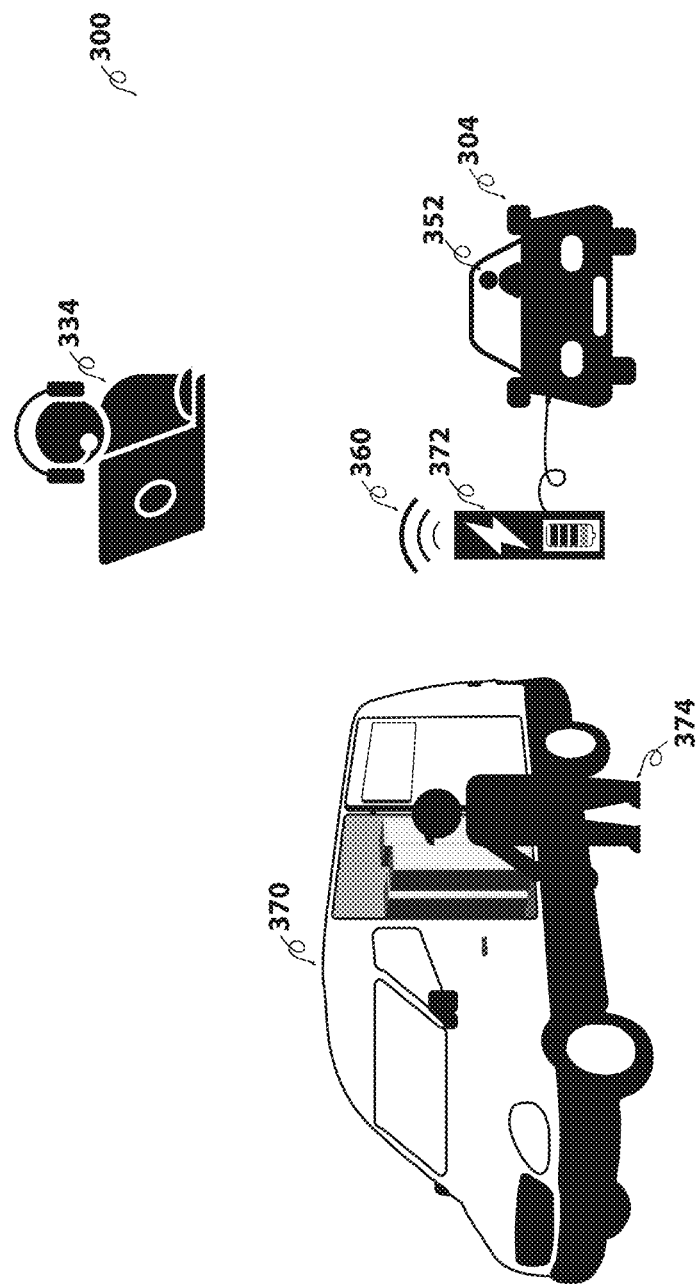

FIG. 16 illustrates a schematic illustration of a mobile power transmitter wherein a charging station is delivered to charge a power receiver, a plug-in electric vehicle, at a location.

FIG. 17 illustrates a schematic illustration of a mobile power transmitter wherein a charging station is delivered by an unmanned aerial vehicle to charge a power receiver, a plug-in electric vehicle, at a location.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In accordance with some embodiments of the present teachings, the present invention provides a mobile power transmitter (MPT) that is configured to move to a power receiver (PR) with or without human intervention and provide transmission of power from the MPT to the PR. This will allow indefinite operation for short- and long-range applications. In some embodiments, the MPT can communicate with the PR.

In the present disclosure, terms are introduced to describe various concepts. These terms include and are defined as follow:

a) A 'mobile power transmitter' (MPT) refers to a device that is capable of moving and/or adjusting its physical status to transmit power to a power receiver. The adjustment may include translational displacement that will require the mobile power transmitter to change position. In some embodiments, the adjustment may include rotation that is defined as a change in spatial orientation. In some embodiments, the mobile power transmitter will rotate toward a target power receiver.

b) A 'power receiver' (PR) refers to a device that receives power. In some embodiments, a power receiver is a device that uses power to perform a task, an example of which is a vehicle that includes, as part of its locomotion capabilities, electrical power derived from a chargeable power storage device. In some embodiments, a power receiver may convert an input power into an alternative type of power to perform a task, an example of which is a device that uses a solar panel to convert electromagnetic radiation to electricity. In some embodiments, a power receiver may store the input power. Non-limiting examples of a power receiver include electric vehicles, electronic devices, robots, drones, aircraft, boats, motorcycles, carts, scooters, spacecraft, rechargeable batteries, power storage systems, and the like.

c) 'Wireless charging' refers to transferring any form of power associated with electric fields, magnetic fields, electromagnetic fields, or otherwise from a transmitter to a receiver without the use of physical electrical conductors (e.g., power may be transferred through free space). In such configurations, the power receiver may receive the power via a "receiving coil" or any other types of electromagnetic power receivers.

Figure 1A:
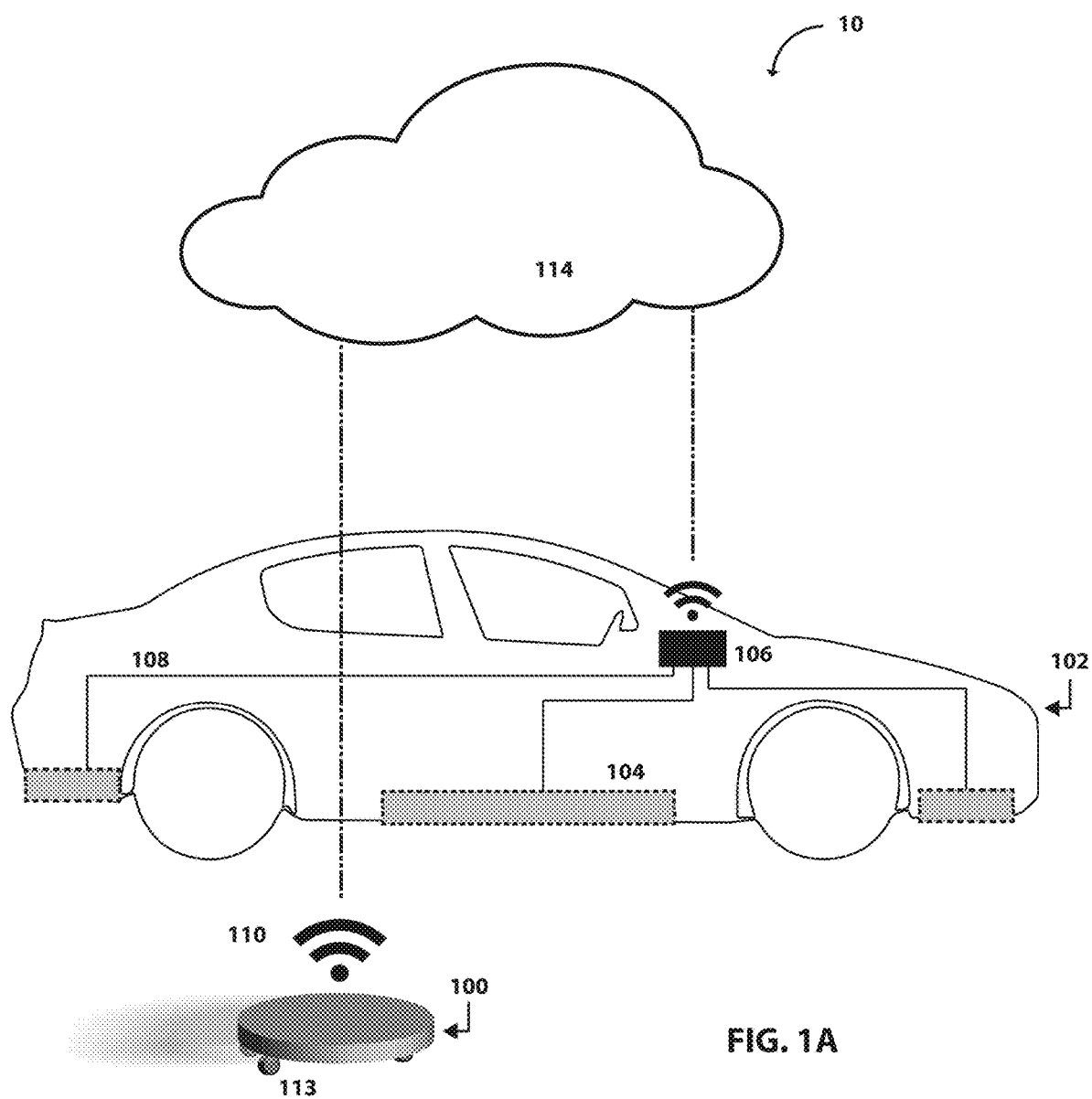
FIG. 1A illustrates an exemplary configuration wherein a deployable MPT is capable of communicating (via the cloud or directly) with a PR's on-board control system, wherein the PR is stationary or in motion.
Figure 1B:
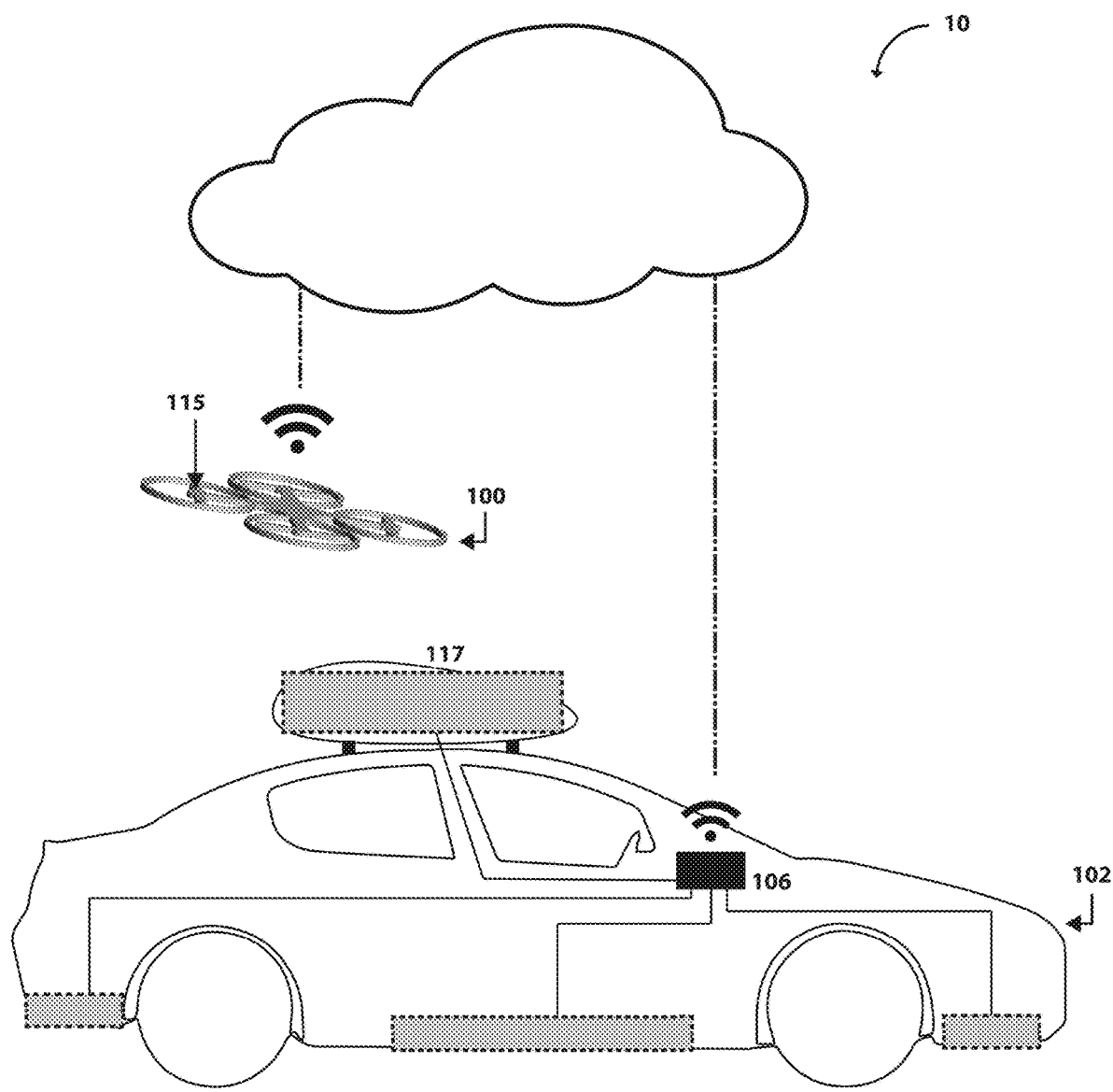
FIG. 1B illustrates a schematic view illustrating a configuration wherein a deployable MPT is capable of communicating (via the cloud or directly) with a PR's on-board control system. The PR has an on-board electromagnetic energy convertor.

In accordance with the teachings of the present disclosure, as illustrated in FIGS. 1A-1B, a power delivery system 10 is provided according to some embodiments. Power delivery system 10 can comprise a deployable MPT 100 and a PR 102. As will be discussed herein, deployable MPT 100 can be translationally displaceable (i.e., FIGS. 1A-1B) or rotationally or pivotally moveable (i.e., FIG. 10).

Figure 2:
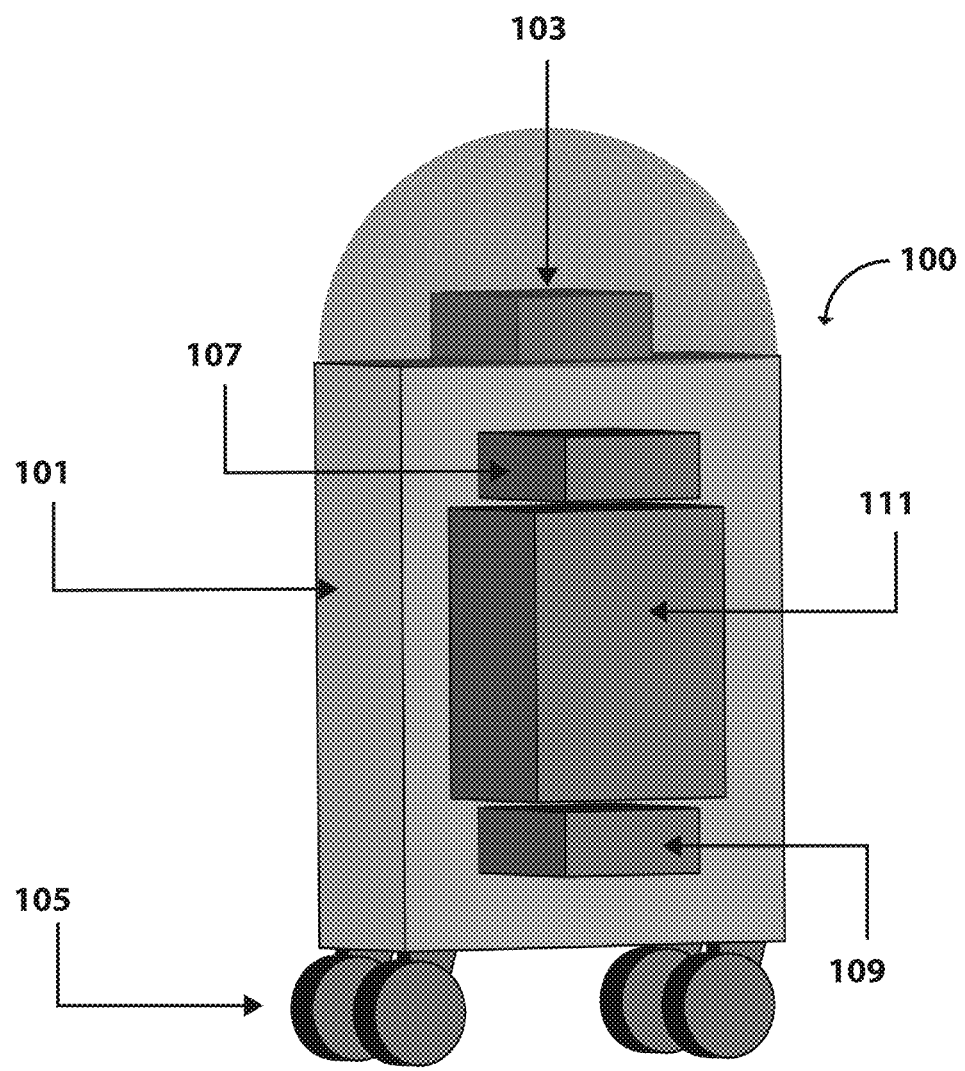
FIG. 2 is a schematic view illustrating a deployable MPT according to the present teachings.

In some embodiments, as illustrated in at least FIG. 2, MPT 100 can comprise a support casing 101, a control system 103, a drive system 105, a communication system 107, a power source system 109, and a charging system 111. In some embodiments, the support casing 101 is an open platform wherein components of the MPT 100 are exposed. In some embodiments, the support casing 101, at least partially, covers components of the MPT 100. In some embodiments, the support casing 101 may remain afloat. In some embodiments, the support casing 101 may provide safety features to avoid and/or minimize accidental impact, such as head lights, turn signals, airbags, and fender. In some embodiments, the support casing 101 can attach to a PR 102. In some embodiments, the support casing 101 can attach to a PR 102 via a physical connector such as hooks, suction cups, chain, pull cable, magnetic connectors, etc. while charging PR 102. In some embodiments, the support casing 101 can attach to PR 102 and detach after charging. In some embodiments, the support casing 101 is constrained by a track, whereby the track is configured to limit motion of MPT 100 along a predetermined charging service route.

In some embodiments, control system 103 includes sensors, such as remote sensing methods, to monitor environmental conditions. In some embodiments, control system 103 comprises cameras. In some embodiments, control system 103 comprises a global positioning system (GPS) unit. In some embodiments, control system 103 comprises a communication system. In some embodiments, control system 103 comprises a data acquisition unit. In some embodiments, control system 103 comprises a data storage unit. In some embodiments, control system 103 comprises a processing unit. In some embodiments, control system 103 can retrieve identification information of PR 102 from a database of identification information of a plurality of power receivers. In some embodiments, control system 103 can search for PR 102. In some embodiments, control system 103 comprises sensors to monitor and process the properties of incoming electromagnetic power for charging and/or communication. In some embodiments, MPT 100 comprises a control system 103 comprising a sensor to monitor status selected from a group of location, environmental conditions, obstacles, traffic signs, sounds, warnings, traffic conditions, proximity to objects, safety features, charge condition, cellular network condition, drive conditions, spatial conditions, radio interference, traffic control updates, road conditions, weather condition, space weather condition, water condition, space debris condition, pressure condition, lighting condition, slope condition, power condition, fuel condition, or a combination thereof. In some embodiments, MPT 100 comprises a control system 103 comprising a sensor selected from a group of remote sensing sensors, such as light and radar (lidar) sensors, photodiodes, such as infrared, photo, and photomultiplier tube sensors, cameras, such as infrared and charge-coupled device cameras, the global positioning system (GPS), orientation sensors, gyroscopes, star trackers, magnetometers, accelerometers, proximity sensors, barcode readers, inclinometers, limit switches, ultrasonic sensors, sonic sensors, piezoelectric sensors, liquid sensors, pressure sensors, or a combination thereof.

In some embodiments, drive system 105 provides a form of propulsion. The form of propulsion may include an engine, a motor, wheels, reaction wheel, levitation coil, rotors, etc. In some embodiments, drive system 105 comprises a suspension unit. In some embodiments, the reaction wheel can be used for attitude control. In some embodiments, the drive system 105 is selected from a group of motor, wheel, tire, pull cable, suspension unit, gearbox, axle, brake, steering wheel, engine, rotor, magnetic levitation, coil, wing, propeller, turbine, paddles, sail, fins, legs, arms, limbs, impeller, rocket, thruster, propulsive nozzle, fly wheel, reaction wheel for attitude control, sled, sledge, rail, track, or a combination thereof. In some embodiments, the drive system 105 is constrained by a track, whereby the track is configured to limit motion of MPT 100 along a predetermined charging service route. For instance, tram-like tracks can be used in urban areas or in parking structures to limit motion of MPT 100 by reducing translational and/or rotational degrees of freedom.

In some embodiments, communication system 107 comprises a wireless data communication system. In some embodiments, communication system 107 is voice activated. In some embodiments, communication system 107 can communicate with a PR 102 or a user preparing to charge via sound. In some embodiments, communication system 107 can communicate with a PR 102 or a user preparing to charge via an interface, such as an interactive display. In some embodiments, communication system 107 communicates a charging service schedule, wherein the charging service schedule comprises at least of scheduled charging allocations and location. In some embodiments, communication system 107 communicates that MPT 100 is available to provide charging. In some embodiments, communication system 107 requests a charging permission from an MPT management system. In some embodiments, communication system 107 can search for PR 102. In some embodiments, communication system 107 can search for PR 102 from a database of charging service requests. In some embodiments, communication system 107 communicates with PR 102 directly or via a web-based application, i.e., the cloud 114. In some embodiments, communication system 107 communicates with a user preparing to charge a PR 102 directly, e.g., via phone or Bluetooth, or via a web-based application, i.e., the cloud 114. In some embodiments, communication system 107 communicates with a traffic management system, such as a police department, to provide traffic updates including accidents. In some embodiments, communication system 107 reports a hazardous condition to a safety management system, such as a fire department, including reporting a fire. In some embodiments, communication system 107 communicates with and provides updates to a traffic management system, such as an air control office. In some embodiments, communication system 107 communicates with a traffic management system and waits for a response, the response including permission to operate, weight limits, charging restrictions, safety requirements to operate, etc. In some embodiments, communication system 107 of a first MPT 100 communicates with a communication system 107 of a second MPT 100. In some embodiments, communication system 107 of a first MPT 100 communicates with other vehicles. In some embodiments, communication system 107 of a first MPT 100 can be contacted by other communication systems. A web-based application is envisioned that can, from many of its capabilities, process charging service requests of a plurality of power receivers and to connect a power receiver to a qualified MPT or a MPT fleet management system, the MPT fleet management system managing a plurality of MPTs. The web-based application can schedule charging service sessions for a plurality of PR's 102 and communicate the schedule with one or more PR's 102 and the qualified MPT or the MPT fleet management system.

In some embodiments, power source system 109 comprises a power storage unit, such as a fuel cell, capacitors, etc. Examples of fuel cells include electrochemical cells, such as batteries and hydrogen fuel cells. The power storage unit may store power in the form of electrical charge. In some embodiments, power source system 109 comprises a power generator unit. In some embodiments, the power generator unit of the power source system 109 converts mechanical energy from fuels such as gasoline, diesel, natural gas, biofuel, etc. into electrical power for charging. In some embodiments, the power generator unit of the power source system 109 is driven by a turbine which converts mechanical energy from wind, steam, water, etc. into electrical power for charging. In some embodiments, power source system 109 receives power from an electrical outlet or a power network. In some embodiments, an operator preparing to charge a PR 102 plugs in an electrical cable of the power source system 109 to an electrical outlet. In some embodiments, power source system 109 receives power from a power network such as a tram-like power distribution line. In some embodiments, power source system 109 comprises a power convertor unit configured to convert one type of power to an applicable type of power that can be transmitted to PR 102. Examples of a power convertor include solar panels, etc. In some embodiments, power source system 109 comprises a power transmitter unit, such as a source of condensed electromagnetic power. In some embodiments, power source system 109 is connected to a power line such as a power outlet. In some embodiments, power source system 109 receives power from a power transmitter. In some embodiments, power source system 109 receives power from an MPT.

In some embodiments, the charging system 111 comprises a charging cable. In some embodiments, the charging system 111 comprises a charging pad to provide wireless charging. In some embodiments, the charging system 111 comprises a source of electromagnetic power and an optical system configured to guide and/or manipulate at least one characteristic of an electromagnetic power, such as light, the at least one characteristic of an electromagnetic power selected from a group of frequency, intensity, propagation direction, wave mode, and polarization. In some embodiments, the charging system 111 comprises electromagnetic power guides such as optical lenses, mirrors, etc. In some embodiments, the charging system 111 comprises at least one reflective surface such as a mirror to guide electromagnetic energy toward PR 102. In some embodiments, the charging system 111 comprises a waveguide, such as a fiber optic. In some embodiments, the charging system 111 is controlled by the control system 103. In some embodiments, the charging system 111 is fully automatic. In some embodiments, the charging system 111 is coupled to a power receiver by an operator. In some embodiments, the charging system 111 is operably coupled to the drive system 105, wherein the drive system provides at least one rotational degree of freedom.

In some embodiments, as illustrated in FIGS. 1A-4, power delivery system 10 is provided wherein deployable MPT 100 is configured to relocate to PR 102 at a location of PR 102. In one embodiment, drive system 105 of MPT 100 is a plurality of wheels 113 (see FIG. 1A). In another embodiment, drive system 105 comprises rotors 115 (see FIG. 1B). MPT 100 can communicate 110 wirelessly (e.g., via a web-based application shown as a computing cloud, 114) or via wired connection (e.g. directly via cable or the like) with an on-board control system 106 of PR 102. In some embodiments, PR 102 carries on-board power storage or convertor units 104 that are connected via line 108 or otherwise operably coupled with on-board control system 106. In some embodiments, MPT 100 is equipped with a communication system 107 that can locate PR 102. In some embodiments, MPT 100 comprises a control system 103 that can track a mobile PR 102. In some embodiments, the mobile PR 102 is an air taxi. In some embodiments, support casing 101 of MPT 100 can attach to PR 102 via physical connectors 128 (see FIG. 4) to transmit power to PR 102.

Figure 3:
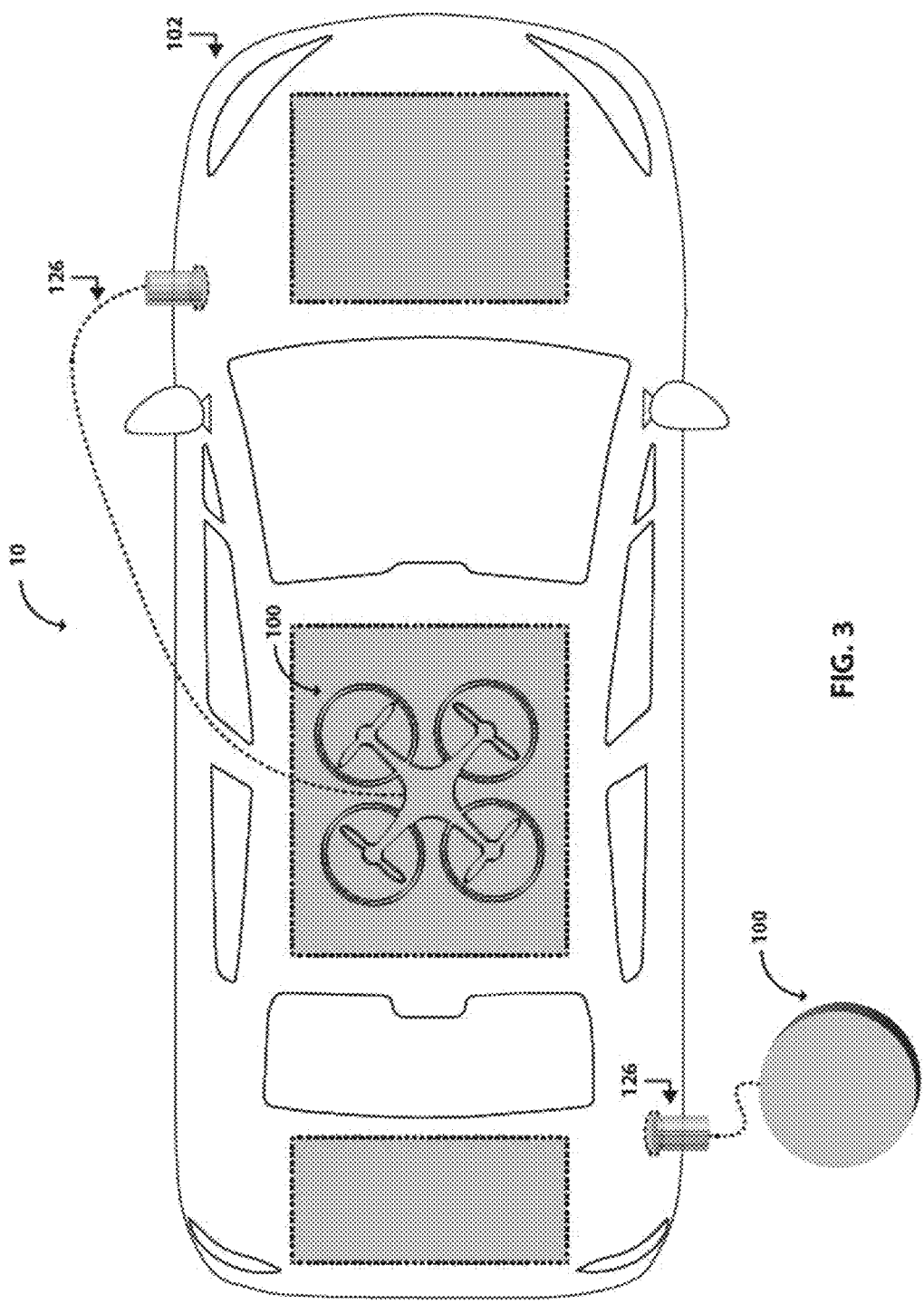
FIG. 3 illustrates a schematic view illustrating a configuration wherein a deployable MPT is capable of communicating (via the cloud or directly) with the PR's on-board control system. The MPT can charge the PR wirelessly or via cable.

With continued reference to FIG. 1A, in some embodiments, MPT 100 can be a movable member disposed below PR 102, such as a vehicle. However, in some embodiments as illustrated in FIG. 1B, MPT 100 can be a movable airborne device, such as a UAV, disposed above or around PR 102. In accordance with some embodiments, the associated power storage 104 and/or onboard control system 106 can be positioned on PR 102 in a position conducive to receive communication and/or power transmission from MPT 100 and/or cloud 114. As illustrated in FIG. 3, in some embodiments, MPT 100 is configured to communicate and/or transmit power to PR 102 via a cable 126.

In some embodiments, as illustrated in FIG. 4, MPT 100 can attach at 128 to PR 102 via physical connectors—in this particular embodiment using magnetic forces 128—while charging to enable continuous operation of PR 102.

FIG. 5 is a schematic view illustrating a configuration wherein a deployable MPT 100, a UAV, is capable of communicating 110 (via the cloud 114 or directly 136) with on-board control system 106 of PR 102. MPT 100 can be a UAV with a landing platform 140 over which PR 102 can land to charge. PR 102 may remain attached to MPT 100 via physical connectors while charging. In some embodiments, PR 102 may detach and take off after charging. PR 102 may land on or attach to MPT 100 while charging via contact or non-contact methods (i.e. wireless) of charging. PR 102 may carry an on-board power storage and/or convertor unit 117. This capability will allow continuous operation.

FIG. 6 is a schematic view illustrating a configuration wherein a deployable MPT 100, a UAV, is capable of communicating 110 (via the cloud 114 or directly) with on-board control system 106 of PR 102. MPT 100 can track and charge at 152 PR 102 wirelessly via transmitting electromagnetic power while PR 102 continues operation. This operation can be done manually by an Operator-In-The-Loop 154, semi-automatically, or fully autonomously without any human intervention. PR 102 may carry one (or more) on-board power storage 104 and/or convertor units 117.

FIG. 7 is a schematic view illustrating a configuration wherein MPT 100 is capable of identifying PR 102. In some embodiments, MPT 100 identifies PR 102 based on transmitted identifying information. In some embodiments, MPT 100 identifies PR 102 from identification information retrieved from a database. In some embodiments, MPT 100 identifies PR 102 based on identifying information, such as a barcode, collected from the body of PR 102. In some embodiments, MPT 100 can move via magnetic levitation 119. In some embodiments, MPT 100 moves with and can attach to a mobile PR 102 to charge. In some embodiments, MPT 100 communicates with and/or transmits power to PR 102 wirelessly. In some embodiments, MPT 100 is constrained to only move along a predetermined charging service route or track 164. Advantages of constraining the motion of MPT 100 along a predetermined charging service route include improved device traffic management, reduced scheduling complexity, as well as increased safety. MPT 100 may carry an on-board power storage unit or it may be attached to the positive and negative poles installed along track 164. MPT 100 may also carry a power convertor unit on-board, such as a solar panel, that charges MPT's on-board power storage unit.

FIG. 8 is a schematic view illustrating a configuration wherein an MPT 100 is installed indoor 170, in this case in a parking structure, and is capable of communicating 110 (via the cloud 172 or directly) with on-board control system 106 of PR 102. MPT 100 may be constrained to only move along one or more predetermined and discrete charging service routes, i.e., such as tracks 164 assigned to individual parking spots 121. In some embodiments, MPT 100 receives a charging service request from PR 102 via the cloud 114 or a parking vending machine. The charging request comprising a parking spot number to which MPT 100 relocates to charge a corresponding PR 102. MPT 100 may extend downward 123 to transmit power to PR 102. The charging service may be requested by a member user.

FIG. 9 is a schematic view illustrating a configuration wherein MPT 100 is installed indoor 170, in this case in a parking structure, and is capable of communicating 110 (via the cloud 114 or directly) with on-board control system 106 of PR 102. MPT 100 is constrained to only move along tracks 164, installed under 190 or above floor surface. MPT 100 may emerge from under the floor surface to provide charge or may remain under the floor surface and provide charge via non-contact methods of charging.

Methods for searching for, identifying, scheduling a charging session, and tracking of an MPT 100 are further provided. In some embodiments, an intelligent charging service system is identified as having an intelligent automatic management system. In some embodiments, intelligent charging service provides automation functions such as inquiring, broadcasting positioning, tracking, recording, searching, confirming, charging, receipt printing, navigating, real-time traffic information, security, emergency help requesting and communication, so as to achieve a total service system with efficacy of high security, high reliability, and time saving. In some embodiments, intelligent charging service system provides charging characteristics of an MPT 100. In some embodiments, the intelligent charging service system provides information regarding an MPT's source of power, information such as the percentage of the MPT's power generated by renewable sources of energy. In some embodiments, the intelligent charging service system provides information regarding carbon footprint of an MPT 100. In some embodiments, the intelligent charging service system provides information regarding the performance of an MPT, including reviews.

In some embodiments, a PR 102 or a user preparing to charge a PR 102 searches for a compatible MPT 100. In some embodiments, a charging service is scheduled based on the charging request from a PR 102. In some embodiments, a PR 102 is a member user. In some embodiments, a method for scheduling a charging session for a PR 102, the method comprising:

a. receiving charging request from a PR 102, the charging request comprising a date, time, location, and information regarding charging characteristics of the PR 102;

b. scheduling a charging session that corresponds to the received charging request; and c. transmitting, to the MPT 100 and the PR 102, instructions regarding the scheduled charging session.

In some embodiments, an MPT 100 is identified automatically to deliver power to a PR 102 or a user preparing to charge. A computer-implemented method for matching a PR 102 with an MPT 100 for a charging service, comprising:

a. receiving charging capability information about a plurality of MPTs;

b. receiving a plurality of charging characteristic information from the PR 102;

c. receiving a request for the charging service from the PR 102;

d. automatically identifying one of the MPTs as a candidate MPT 100 for the charging service based on the charging characteristic information and the charging capability information responsive to the received request; and e. providing charging instructions to the PR 102 and the identified candidate MPT 100 to match the PR 102 with the identified candidate MPT 100.

In some embodiments, the MPT 100 is of an MPT management system. In an MPT management system comprising at least one computer associated with said facility and at least one MPT 100 with compatible charging accommodations for a PR 102 and equipped with safety procedures and control, drive, communication, power source, and charging systems to deliver power to a PR according to a PR-request to charge at a location, said MPT management system and MPT with improved operational and safety features being comprised of:

a. a PR-request received by the computer for the PR 102, b. information sent by the computer to the PR 102 comprising charging instructions and the PR 102 proceeds to a charging zone according to the charging instructions, c. instructions sent from the computer to the communication system 107 of the MPT 100 to send the MPT 100 to the charging zone according to instructions, d. the MPT arriving at the charging zone and proceeding to charge the PR 102, e. the computer confirming from the MPT communication system 107 that the MPT 100 proceeding to charge the PR 102 is in compliance with instructions and safety procedures, f. the computer validates charging information according to the instructions, g. computer instructing the MPT 100 to initiate charging, and h. the MPT 100 informs the computer of its safe and complete charging according to the instructions.

In some embodiments, power delivery is provided by an MPT 100 serving the charging needs of a group of PRs on a regular basis. In some embodiments, a method to service the local charging service needs of PRs using web-based data entries and integrated geographic systems to group similar PR 102 charging requirements, said method comprising the following steps:

a. receiving from a PR 102 directly into a first database charging characteristics information, if applicable, billing data, said PR's anticipated regular and occasional charging requests for a known period of time, said charging requests consisting of date, desired charging time, desired charging location, frequency, and charging characteristics of said PR 102 having specific charging restrictions;

b. itemizing and merging all trip requests for all PRs by date, desired charging time, and desired charging location;

c. organizing said merged charging requests into subgroups of similar individual charging requests at least weekly;

d. verifying with each PR 102 charging requests for a month to insure that all charging requested are serviced correctly;

e. identifying an MPT 100 for the charging service based on the organized charging requests;

f. notifying each PR the MPT 100 identity and time of each charging session and allocated charging for each date charging service will be delivered.

FIG. 11 is a flow chart of an exemplary algorithm through which PR 102 or a user preparing to charge a PR 102 requests a charge at step 192 (via mobile application, website, on-board communication system, etc.) from a local charging service provider in step 194 and receives charging without the need to go to a charging service provider, an MPT 100. MPT 100 is a deployable charging system. In some embodiments, MPT 100 tracks PR 102 at step 198 with the use of Global Positioning System (GPS) 196. MPT 100 proceeds to charge PR 102 wirelessly or via a physical connector. The charging can be done while PR 102 is still in operation without interruption.

FIG. 12 is a flow chart of an exemplary algorithm through which charging status of PR 102 is assessed continuously 200. In some embodiments, the PR 102 is of a PR management system, wherein the PR management system comprising a plurality of PRs having charging characteristics, locations, schedules, etc. In some embodiments, the continuous charging status is assessed by a PR management system. A request for charging 202 is generated when the PR needs charging. Based on the information provided in the charging request, a compatible 204 MPT 100 from a charging service management is identified, informed in step 202, and deployed to charge the PR 102. In some embodiments, the PR 102 may be provided information in step 206 regarding a plurality of MPT fleet management services to choose from. In some embodiments, the PR 102 may be provided information 206 comprising a schedule regarding the time and the amount of allocated charge determined based on the generated charging request.

FIG. 13 is a flow chart of an exemplary algorithm through which charging status of a PR 102 is assessed continuously in step 208. A request for charging 210 is automatically generated when the PR 102 needs charging. The PR 102, in this case, is already a member of a fleet management service providing charging service to a plurality of known PRs. The PR 102 may by stationary and may have an on-board power convertor. The MPT 100 is informed of the charging service in step 201 may move to the PR 102 requesting for a charge by rotating toward it in step 212.

In some embodiments, the MPT 100 is operated by an operator on site. In some embodiments, an MPT 100 needs plugging into an outlet while preparing to charge. In some embodiments, the MPT 100 is operated by a user who requested charging for a PR 102. In some embodiments, an operator manually charges a PR 102 using the charging system 111 of MPT 100. In some embodiments, the MPT 100 is constrained to only along a predetermined charging route such as a tram-like track which simplifies charging by eliminating at least one translational degree of freedom. In some embodiments, MPT 100 arrives at a charging zone based on charging instructions shared by a computer of an MPT management system or processed locally by the MPT's processing unit of the control system 103, and proceeds to automatically charge a PR 102. In some embodiments, a charge sequence method for charging a PR 102 with a first MPT 100, the method comprising:

a. retrieving identification information of the PR 102 from a database containing identification information of a plurality of PRs, the identification information containing information regarding at least one charging characteristic of the PR;

b. determining an appropriate position and orientation of the first MPT 100 relative to the PR 102, based on the identification information; and c. collecting time-stamped surveying information; the time-stamped surveying information comprising a position and an orientation of the first MPT 100 relative to the PR 102 while the first MPT 100 adjusts and updates its time-stamped surveying information;

wherein accomplishing the appropriate position and orientation relative to the PR 102 by the first MPT 100 through iteratively adjusting its position and orientation relative to the PR 102 causes the MPT 100 to proceed a charging process.

In some embodiments, the charging process involves continuous monitoring of the amount of charge delivered relative to the allocated charge based on the instruction processed by MPT 100 control system 103. In some embodiments, a method of charging a PR 102 of a plurality of PRs comprising an electromagnetic power convertor and a power storage unit by a first MPT 100, wherein power characteristic varies with the state of charge of the power storage unit on-board the PR and in which the power characteristic varies with time during charging until attaining substantial full charge, the method comprising:

a. retrieving identification information of the PR from a database containing identification information of a plurality of PRs, the identification information containing information regarding at least one charging characteristic of the PR;

b. monitoring time-stamped surveying information; the time-stamped surveying information comprising a position and an orientation of the MPT 100 relative to the PR 102 while the first MPT 100 adjusts and updates its time-stamped surveying information;

c. determining an allocation amount and provision time of electromagnetic power to the PR 102;

d. providing electromagnetic power to charge the power consumer based on the determined allocation amount and provision time;

e. collecting time-stamped status information from at least one electromagnetic sensor on-board the PR 102, the electromagnetic sensor configured to monitor at least one characteristic of the provided electromagnetic power; and f. monitoring the power characteristic of the power storage unit on-board the power consumer and the collected time-stamped status information from the at least one electromagnetic sensor on-board the PR 102 periodically during charging.

In some embodiments, both the MPT 100 and PR 102 are mobile and the power delivery is performed while the PR 102 continues operation. In some embodiments, a method of charging in a two mobile rigid-body system comprising an MPT 100 and a mobile PR, for instance an air taxi in operation, etc., the mobile PR 102 comprising an electromagnetic power convertor and a power storage unit, wherein power characteristic varies with the state of charge of the power storage unit on-board the mobile PR 102 and in which the power characteristic varies with time during charging until attaining substantial full charge, the method comprising:

a. determining an appropriate position and orientation of the MPT 100 relative to the mobile PR 102;

b. monitoring first time-stamped surveying information; the first time-stamped surveying information comprising a position and an orientation of the MPT relative to the mobile PR 102;

c. transmitting, to the MPT 100, the determined appropriate position and orientation of the MPT 100 relative to the mobile PR 102;

d. monitoring second time-stamped surveying information; the second time-stamped surveying information comprising a position and an orientation of the mobile PR 102 relative to the MPT 100;

e. determining an allocation amount and provision time of electromagnetic power to the mobile PR 102;

f. providing electromagnetic power to charge the mobile PR 102 based on the determined allocation amount and provision time;

g. collecting time-stamped status information from at least one electromagnetic sensor on-board the mobile PR 102, the electromagnetic sensor configured to monitor at least one characteristic of the provided electromagnetic power; and h. monitoring the power characteristic of the power storage unit on-board the mobile PR 102 and the collected time-stamped status information from the at least one electromagnetic sensor on-board the mobile PR 102 periodically during charging;

wherein at least one body of the two mobile rigid-body system adjusts and updates its time-stamped surveying information based on the determined appropriate position and orientation.

In accordance with the present teachings, the present disclosure also provides systems and methods for charging power receivers (PRs) 304, including plug-in electric vehicles (PEVs) 350, via a decentralized charging network of mobile power transmitters (MPTs) 300. As illustrated in FIG. 14, for example, a decentralized charging network of MPTs 300 comprises a server 302 and, in some embodiments, a plurality of MPTs 306. In some embodiments, the server 302 is a web-based MPT management system administering the charging service operations of a plurality of MPTs 306. In some embodiments, the server 302 is a computer. In some embodiments, the server 302 is accessed via phone, radio, cell network, electronic text message, and the like.

The server 302 can further manage and report charging transactions to private and public entities. In some embodiments, the server 302 reports to oversight authorities 320 including the transportation and energy departments. The server 302 can also communicate with safety authorities 322 to insure a safe and secure power delivery. The server 302 can further contact financial entities 324 in order to process a payment and/or report a PR history of charging using carbon-free sources for qualifying tax-exemption purposes. In yet other embodiments, a server 302 can communicate with power distributors 326 to insure a steady and smart use of power. In some embodiments, an MPT 306 may choose to plug in to an on-sight power outlet for recharging depending on the time of the day, etc. In other embodiments, a server 302 provides information to an MPT 306 regarding recharging schedule of a power producer such as a solar farm. In some embodiments, the server 302 communicates with a power management system to schedule an upcoming MPT recharging session. In some embodiments, a server 302 may contact a property management 328 and process information regarding parking permits, parking violations, on-site safety features, on-site power accessibility, etc.

In some embodiments, the server 302 has access to a PR database 330 containing identification information of a plurality of PEVs 350 and charging information of a plurality of MPTs 306. In some embodiments, the PEV identification information contains membership information and charging characteristics. In some embodiments, the membership information comprises account number, payment information, desired charging locations, desired charging times, and PEV access instructions including safety and security information. In some embodiments, the charging characteristics include maximum current, maximum voltage, recommended charging duration, and charging type such as contact and/or non-contact charging characteristics. In some embodiments, the charging is requested and/or performed by an operator 352. In some embodiments, the PEV 350 automatically requests a charging. In some embodiments, the PEV charging is recurrent.

In some embodiments, the server 302 has access to an MPT database 332 containing charging information of a plurality of MPTs 306. In some embodiments, the MPT 306 charging information contains onboard charging system information 314 and charging schedule. In some embodiments, the MPT 306 onboard charging system 314 information includes onboard receptacle type(s), available charge, operational current and voltage characteristics, percentage of charge from renewable sources, and onboard safety and security capabilities. In some embodiments, the charging schedule contains information such as radius of operation, operational dates and hours, available charging times, reserved charging locations, reserved charging times, and reserved charging durations. In some embodiments, the MPT 306 charging information contains information regarding the MPT 306 self-charging such as self-charging time, duration, location, etc.

In some embodiments, the MPT 306 comprises a control system 310, a power source system 312, a charging system 314, and a communication system 316. The control system 310 is the central processing unit and controls the charging operations of the MPT 306. In some embodiments, the control system 310 contains a central processing unit (CPU). In some embodiments, the control system 310 includes a graphical processing unit (GPU) and can monitor, and, in some embodiments, record processes in an on-board memory unit. In some embodiments, the control system 310 includes sensors such as the global positioning system (GPS) to indicate the location of the MPT. The control system is an essential component of an MPT 306 controlling the operations of the power source system 312, the charging system 314, and the communication system 316.

In some embodiments, the power source system 312 includes a power storage unit selected from a list of battery 340, rechargeable battery, capacitor, supercapacitor, flywheel, and fuel cell. In some embodiments, the power source system converts energy from one energy form to another. In some embodiments, the power source system includes an inverter which converts direct current (DC) to alternating current (AC) or vice versa. In some embodiments, the power source system includes a charge measuring device 142 to control and, in some cases, record the transfer of charge.

In some embodiments, the charging system 314 includes a cord and a connector to transfer charge from the power source system to the PEV 350. In some embodiments, the charging system 314 includes plugging connectors that are compatible with either the Level 1, Level 2, and/or DC fast-charging charging receptacles. In some embodiments, the charging system is a non-contact charging system such as a charging pad and electromagnetic radiation source for power beaming. The U.S. Ser. No. 18/049,880 provides an electromagnetic power convertor device that converts electromagnetic radiation into electricity.

The communication system 316 is configured for communication between a server 302, PR 304, and MPT 306. In some embodiments, the communication system 316 contains a display to provide real-time charging transfer information such as electric current, voltage, charging duration, and time until completion. In some embodiments, the communication system 316 is selected from a list of display, keypad, voice-activated interface, interactive interface, microphone, speaker, optical communication system, barcode reader, chip reader, communication sensor (e.g., radio frequency identification (RFID)), modem and wireless communication system, local area network (LAN) communication system, Bluetooth® communication system, wireless personal area network (WPAN) communication system, near-field communication (NFC) system, ZigBee® communication system, wireless local area network (WLAN) communication system, radio communication system, microwave communication system, power line communication (PLC) system, broadcast messaging system, cellular communication system, such as cellular robotic system and cell phone service, and wide area network (WAN) communication system, such as the Internet to access the Web.

As illustrated in FIG. 15, in some embodiments, the decentralized charging network of MPTs 300 involves a server 302, such as MPT management personnel 334, instructing an MPT 306 to drive to a PR 304 requesting a charge. The instructions and the charging session updates are communicated 360 between the server 302 and the MPT 306. The instructions sent to the MPT includes information regarding the PR charging receptacle type. According to the instructions, the MPT provides a compatible charging device from the charging system 314 to charge the PR 304. The PR operator can receive more information about the charging session and interact with the MPT's communication system 316 via an interactive display and keypad.

As illustrated in FIG. 16, in some embodiments, the decentralized charging network of MPTs 300 is a charge delivery system 370. The charge delivery system 370 delivers a charging station 372 to a location of a PR 304, e.g., a PEV 350. In some embodiments, an operator 352 preparing to charge a PEV 350 requests and receives an MPT, a charging station 372, at their desired charging time and location. The charging request is processed by a server 302, such as MPT management personnel 334 with access to computers and databases 330 and 332, and sent to an MPT, a charge delivery system 370. The charge delivery system 370 is operated by a technician and/or a driver 374. The charge completion is communicated with the server 302 by the communication system 316 of the charging station 372. In some embodiments, the MPT is returned to the MPT management system. In some embodiments, the MPT is disposable. In some embodiments, the MPT can be recharged. In some embodiments, the MPT is picked up after the charging is completed. In some embodiments, the MPT pick up is scheduled. In some embodiments, the charging station travels with the PEV. In some embodiments, the MPT can charge a PEV while in operation.

In some embodiments, such as illustrated in FIG. 17, the MPT 306 is an unmanned aerial vehicle (UAV) 376 delivering a charging station 372 to a PR 304 preparing to charge. In other embodiments, the MPT 306 can deliver power via land, sea, air, and/or space. In yet other embodiments, PR 304 can be a PEV, scooter, sea transportation systems such as boats and submarines, aerial vehicles such as UAVs and air taxis, space-borne vehicles such as a robot, or underground vehicles such as mining systems.

In some embodiments, an MPT 306 arrives at a location of a PEV 350 requesting charging based on charging instructions generated by a server 302. The MPT 306, a charging station 372, is positioned in close proximity to the PEV 350 such that a cable of the MPT charging system 314 can reach the PEV 350 charging receptacle. The MPT communication system 316 and the control system 310 confirm the initiation of a charging session and, therefore, the charging is activated. The real-time charging information is provided by the MPT communication system 316. Meanwhile, the control system 310 ensures the safety of the operations. The charge measuring device 342 of the power source system monitors the charging and provides real-time charging information to the control system 310. Once charging is completed, the control system 310, the communication system 316, and the power source system 312 deactivate the charging and communicate 360 the charging completion. The charging system is then disengaged.

A decentralized charging network of MPTs is managed by a server 302 with access to PR 304 and MPT 306 information. Upon receiving a charging request from a PR 304, an operator 352 preparing to charge, and/or a recurring charging request, the server 302 identifies an MPT 306. The MPT identification can depend on the MPT compatibility, charging capability, and/or availability. The identified MPT then arrives at the location of the charge-requesting PR 304 based on the charging instructions generated by the server 302. Upon arriving, the PR 304 and MPT 306 confirm the charging instructions. The charging is then started. The charging is monitored in real-time. Upon completion, the charging is deactivated and the charging operation is confirmed finished.

A method of transferring charge between a mobile power transmitter having an onboard power source system and a power receiver, comprising:
    maintaining by a server a user dataset containing identification information of a plurality of member power receivers, the identification information containing membership information and charging characteristics of power receivers;
    maintaining by a server a provider dataset containing charging information of a plurality of mobile power transmitters, the charging information containing onboard charging system information and charging schedule;
    receiving by the server a charging request from an operator of a power receiver from the user dataset, the charging request is generated by a communication system of the operator of the power receiver, the charging request containing at least a desired charging time interval and a desired charging location;
    identifying by the server a mobile power transmitter from the provider dataset, the identification is made based on the received charging request and the charging information of the mobile power transmitter;
    sending by the server to a communication system of the identified mobile power transmitter a first charging instructions, the first charging instructions containing information about the charge requesting power receiver, a scheduled charging time, and charging location and waiting for a confirmation;
    contacting by the server the operator of the power receiver with a second charging instructions after receiving the confirmation, the second charging instructions containing information about the identified mobile power transmitter, a scheduled charging time and charging location;
    the mobile power transmitter arriving at the scheduled charging time to the scheduled charging location based on the first charging instructions, the arrival is verified by the server;
    on server verification, providing a charging system for transferring charge, wherein the charging system is supported by the onboard power source system of the mobile power transmitter, the onboard power source system being controlled by an onboard control system;
    proceeding to transfer charge to the power receiver from the power source system of the mobile power transmitter via the charging system, the charge transfer being communicated to the communication system of the operator of the power receiver by the communication system of the mobile power transmitter, the charge transfer being activated by the control system of the mobile power transmitter;
    monitoring the charge transfer by a charge measuring device of the charge source system of the mobile power transmitter, the charge measuring device is connected to the onboard control system, the onboard control system configured to monitor the output of the charge measuring device, maintain running total of charge transferred, and detect the completion of the charge transfer; and
    on detecting completion, disabling charge transfer and communicating the completion of charge transfer to the server and to the communication system of the operator of the power consumer.

In some embodiments, the PR 304 comprises an on-board communication system capable of directly contacting a server 302 to request a charging. A method of transferring charge between a mobile power transmitter having an onboard power source system and a power receiver, comprising:
    maintaining by a server a user dataset containing identification information of a plurality of member power receivers, the identification information containing membership information and charging characteristics of power receivers;
    maintaining by a server a provider dataset containing charging information of a plurality of mobile power transmitters, the charging information containing onboard charging system information and charging schedule;
    receiving by the server a charging request from a power receiver from the user dataset, the charging request is generated by a mobile wireless communication system onboard the power consumer, the charging request containing at least a desired charging time interval and a desired charging location;

identifying by the server a mobile power transmitter from the provider dataset, the identification is made based on the received charging request and the charging information of the mobile power transmitter;

sending by the server to a communication system of the identified mobile power transmitter a first charging instructions, the first charging instructions containing information about the charge requesting power receiver, a scheduled charging time, and charging location and waiting for a confirmation;

contacting by the server the power receiver with a second charging instructions after receiving the confirmation, the second charging instructions containing information about the identified mobile power transmitter, a scheduled charging time and charging location;

the mobile power transmitter arriving at the scheduled charging time to the scheduled charging location based on the first charging instructions, the arrival is verified by the server;

on server verification, providing a charging system for transferring charge, wherein the charging system is supported by the onboard power source system of the mobile power transmitter, the onboard power source system being controlled by an onboard control system;

proceeding to transfer charge to the power receiver from the power source system of the mobile power transmitter via the charging system, the charge transfer being communicated to the mobile wireless communication system of the power receiver by the communication system of the mobile power transmitter, the charge transfer being activated by the control system of the mobile power transmitter;

monitoring the charge transfer by a charge measuring device of the charge source system of the mobile power transmitter, the charge measuring device is connected to the onboard control system, the onboard control system configured to monitor the output of the charge measuring device, maintain running total of charge transferred, and detect the completion of the charge transfer; and upon detecting completion, disabling charge transfer and communicating the completion of charge transfer to the server and to the mobile wireless communication system of the power consumer.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A charging network of mobile power transmitters, comprising:
    a first power receiver of a plurality of power receivers;
    a server configured to access a user dataset having identification information of the plurality of power receivers, wherein the identification information of the user dataset comprises membership information and charging characteristics of each of the plurality of power receivers; and
    a mobile power transmitter configured to be moveably deployed to a location and configured to transfer charge to the first power receiver, the mobile power transmitter having:
        a control system having a processing unit outputting a control signal,
        a power source system having a charge measuring device configured to monitor a charge transfer,
        a charging system configured to transfer the charge from the power source system to the first power receiver in response to the control signal from the control system, and
        a communication system configured to enable communication between the first power receiver, the server, and the control system,
    wherein the server is further configured to access a provider dataset having charging information of the mobile power transmitter, the charging information having onboard charging system information and charging schedule.

2. The charging network according to claim 1 wherein the identification information of the user dataset comprises membership information and charging characteristics of each of the plurality of power receivers, wherein the charging characteristics is selected from a list of maximum current, maximum voltage, recommended charging duration, and charging type, wherein the charging type is selected from a list of contact and non-contact charging characteristics.

3. The charging network according to claim 1 wherein the server is configured to communicate with the first power receiver and the mobile power transmitter.

4. The charging network according to claim 1 wherein the server is configured to schedule a charging session at the location to transfer the charge to the first power receiver based on the charging information of the user dataset.

5. The charging network according to claim 1 wherein the mobile power transmitter comprises a plurality of mobile power transmitters, each of the plurality of mobile power transmitters having:
    an independent control system having a processing unit outputting a discrete control signal,
    an independent power source system having a charge measuring device configured to monitor a charge transfer,
    a charging system configured to transfer the charge from the independent power source system to one of the plurality of power receivers in response to the independent control signal from the independent control system, and
    a communication system configured to enable communication between the one of the plurality of power receivers, the server, and the independent control system.

6. A method of transferring charge between a mobile power transmitter having an onboard power source system and a member power receiver, the method comprising:
    maintaining by a server a user dataset having identification information of a plurality of member power receivers, wherein the identification information having membership information and charging characteristics of the plurality of member power receivers;
    maintaining by the server a provider dataset having charging information of a plurality of mobile power transmitters, wherein the charging information having onboard charging system information and charging schedule;

receiving by the server a charging request from a first of the plurality of member power receivers;

identifying by the server a first of the plurality of mobile power transmitters from the provider dataset;

sending by the server to a communication system of the first mobile power transmitter a first charging instructions and awaiting a confirmation;

contacting by the server the first member power receiver with a second charging instructions after receiving the confirmation, the second charging instructions having information about the identified mobile power transmitter, a scheduled charging time and charging location;

the mobile power transmitter arriving at the scheduled charging time to the scheduled charging location based on the first charging instructions;

providing a charging system for transferring charge, wherein the charging system is supported by the onboard power source system of the mobile power transmitter, the onboard power source system being controlled by an onboard control system; and proceeding to transfer charge to the power receiver from the power source system of the mobile power transmitter via the charging system.

7. The method according to claim 6, wherein the identification information comprises membership information and charging characteristics of the plurality of member power receivers, wherein the charging characteristics is selected from a list of maximum current, maximum voltage, recommended charging duration, and charging type, wherein the charging type is selected from a list of contact and non-contact charging characteristics.

8. The method according to claim 7, wherein the charging information comprises onboard charging system information and charging schedule.

9. The method according to claim 8, wherein the charging request is generated by a mobile wireless communication system onboard the power consumer.

10. The method according to claim 9, wherein the charging request comprises at least a desired charging time interval and a desired charging location.

11. The method according to claim 10, wherein the identifying step is made based on the received charging request and the charging information of the mobile power transmitter.

12. The method according to claim 11, wherein the first charging instructions comprises information about the charge requesting power receiver, a scheduled charging time, and charging location and waiting for a confirmation.

13. The method according to claim 12, wherein the mobile power transmitter arriving at the scheduled charging time to the scheduled charging location based on the first charging instructions comprises the mobile power transmitter arriving at the scheduled charging time to the scheduled charging location based on the first charging instructions and being verified by the server.

14. The method according to claim 13, wherein upon the verification of the server, the step of providing a charging system for transferring charge is performed.

15. The method according to claim 14, wherein the charge transfer being communicated to the mobile wireless communication system of the power receiver by the communication system of the mobile power transmitter, the charge transfer being activated by the control system of the mobile power transmitter.

16. The method according to claim 15, further comprising:

monitoring the charge transfer by a charge measuring device of the charge source system of the mobile power transmitter, the charge measuring device is connected to the onboard control system, the onboard control system configured to monitor the output of the charge measuring device, maintain running total of charge transferred, and detect the completion of the charge transfer; and on detecting completion, disabling charge transfer and communicating the completion of charge transfer to the server and to the mobile wireless communication system of the power consumer.

17. The charging network according to claim 1, wherein the provider dataset comprises charging information of the mobile power transmitter, the charging information comprises onboard charging system information and charging schedule, wherein the onboard charging system information is selected from a list of onboard receptacle type(s), available charge, operational current and voltage characteristics, percentage of charge from renewable sources, onboard safety and security capabilities, and mobile power transmitter self-charging information, wherein the mobile power transmitter self-charging information is selected from a list of self-charging time, duration, and location.

18. The charging network according to claim 1, wherein the provider dataset comprises charging information of the mobile power transmitter, the charging information comprises onboard charging system information and charging schedule, wherein the charging schedule is selected from a list of radius of operation, operational dates and hours, available charging times, reserved charging locations, reserved charging times, and reserved charging durations.

19. The method according to claim 6, wherein the provider dataset comprises charging information of the mobile power transmitter, the charging information comprises onboard charging system information and charging schedule, wherein the onboard charging system information is selected from a list of onboard receptacle type(s), available charge, operational current and voltage characteristics, percentage of charge from renewable sources, onboard safety and security capabilities, and mobile power transmitter self-charging information, wherein the mobile power transmitter self-charging information is selected from a list of self-charging time, duration, and location.

20. The method according to claim 6, wherein the provider dataset comprises charging information of the mobile power transmitter, the charging information comprises onboard charging system information and charging schedule, wherein the charging schedule is selected from a list of radius of operation, operational dates and hours, available charging times, reserved charging locations, reserved charging times, and reserved charging durations.

* * * * *